[12] United States Patent
Yamazaki

(10) Patent No.: US 6,947,642 B2
(45) Date of Patent: Sep. 20, 2005

(54) OPTICAL RESONATOR WAVEGUIDE DEVICE AND METHOD OF FABRICATING THE SAME

(75) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 10/439,760

(22) Filed: May 16, 2003

(65) Prior Publication Data

US 2003/0235367 A1 Dec. 25, 2003

(30) Foreign Application Priority Data

May 17, 2002 (JP) ........................................ 2002-143505

(51) Int. Cl.$^7$ ............................. G02B 6/28; G02B 6/12; G02B 6/13
(52) U.S. Cl. ............................. 385/39; 385/3; 385/40; 385/50; 385/14; 385/24
(58) Field of Search ............................... 385/2, 3, 8, 9, 385/14, 24, 27, 28, 32, 40, 41, 48, 50

(56) References Cited

U.S. PATENT DOCUMENTS

| | | | |
|---|---|---|---|
| 6,084,992 A | * | 7/2000 | Weber et al. .................. 385/24 |
| 6,259,848 B1 | | 7/2001 | Bagley et al. |
| 6,289,151 B1 | | 9/2001 | Kazarinov et al. |
| 6,389,203 B1 | * | 5/2002 | Jordan et al. .................. 385/50 |
| 6,766,083 B2 | * | 7/2004 | Bona et al. .................... 385/40 |
| 6,788,838 B2 | * | 9/2004 | Ho .............................. 385/50 |
| 2003/0048989 A1 | * | 3/2003 | Kashihara et al. ............ 385/37 |
| 2003/0202743 A1 | * | 10/2003 | Shibata ........................ 385/27 |

FOREIGN PATENT DOCUMENTS

| EP | 1 024 378 A2 | 8/2000 |
|---|---|---|
| EP | 1 158 326 A2 | 11/2001 |

OTHER PUBLICATIONS

Madsen, C.K., et al., "Optical All–Pass Filters for Phase Response Design with Applications for Dispersion Compensation", IEEE Photonics Technology Letters (1998), vol. 10, No. 7, pp. 996.
"Tunable Ring Resonator Dispersion Compensators Realized in High–Refractive–Index Contrast SiON Technology", F. Horst, et al., ECOC (2000).
"Compact Integrated Tunable Chromatic Dispersion Compensator with a 4000 ps/nm Tuning Range", C.K. Madsen, OFC (2001).
"Optical Multi–Mode Interference Devices Based on Self–Imaging: Principles and Applications", Lucas B. Soldano, et al., pp. 615–627, IEEE (1995).

* cited by examiner

Primary Examiner—Akm Enayet Ullah
Assistant Examiner—Omar Rojas
(74) Attorney, Agent, or Firm—Scully, Scott, Murphy & Presser

(57) ABSTRACT

An optical waveguide device expands the operable frequency range toward the higher frequency side. The device includes a single-mode optical resonator waveguide serving as an optical ring resonator, a single-mode optical input/output waveguide located close to the resonator waveguide in an area, and a Mach-Zehnder interferometer formed in such a way as to include a part of the resonator waveguide as its first optical waveguide arm and a part of the input/output waveguide as its second optical waveguide arm in the area. The interferometer has a first optical coupler for optically coupling the first and second waveguide arms with an input-side part of the input/output waveguide and a remaining part of the resonator waveguide due to multiple-mode optical interference, and a second optical coupler for optically coupling the first and second waveguide arms with an output-side part of the input/output waveguide and the remaining part of the resonator waveguide due to multiple-mode optical interference.

40 Claims, 11 Drawing Sheets

US 6,947,642 B2

OPTICAL RESONATOR WAVEGUIDE DEVICE AND METHOD OF FABRICATING THE SAME

BACKGROUND OF THE INVENTION

1. Field of the Invention

The present invention relates to an optical waveguide device and a method of fabricating the same. More particularly, the invention relates to an optical waveguide device using at least one optical ring resonator having an expanded operable or usable frequency range to the upper frequency side, and a method of fabricating the device.

2. Description of the Related Art

In recent years, the transmission rate of optical fiber communication has been increasing continuously. For example, a transmission rate as high as 10 Gigabit per second (Gbit/s) has been actually introduced into commercial optical communication systems. Moreover, in the research and development fields of optical fiber communication, experimental results that 40 Gbit/s, 160 Gbit/s, and higher transmission rates were experimentally realized in optical fiber communication systems have been already reported so far.

In general, when the transmission rate is raised to 10 Gbit/s or higher, "wavelength dispersion" of an optical fiber will badly affect the performance of signal light transmission conspicuously, which often restricts the transmittable distance by way of optical fibers. This is because the velocity of signal light propagating through an optical fiber has wavelength dependence. Specifically, in general, spectral line broadening occurs in the oscillation mode due to the so-called wavelength chirping induced on optical modulation. If a transmission line or path has wavelength dispersion, the transmission rate of signal light propagating in the line or path will vary within the broadened spectrum line. Therefore, after long-distance transmission by way of optical fibers, the arriving time of the components of the signal light will vary according to their wavelength and as a result, the waveform of the modulated signal light will degrade or deform. Such the waveform degradation or deformation of the modulated signal light makes it difficult to reproduce its original waveform as desired.

To solve this problem, various types of "compensated optical fiber" have ever been extensively used. The compensated optical fiber includes a core with a diameter smaller than that of ordinary optical fibers, thereby generating negative wavelength dispersion therein. Due to the negative wavelength dispersion, wavelength dispersion occurring in an active optical fiber through which signal light is being transmitted is cancelled and as a result, possible waveform degradation of the propagating signal light is prevented.

However, the compensated optical fiber has many restrictions for use. For example, (i) the total length needs to be at least approximately 20 km, (ii) the input level of the signal light has to be sufficiently low in order to prevent the "four lightwave mixture" phenomenon due to optical non-linearity, and (iii) wavelength dispersion is unable to be adjusted at the setting-up scene or site for actually setting up optical fibers. Here, the "tour light-wave mixture" phenomenon is a phenomenon that a substance virtually absorbs two photons due to its non-linear polarization and then, emits two photons in such a way as to conserve energy. Additionally, the compensated optical fiber has a problem that the loss rate of the signal light is relatively high compared with ordinary optical fibers.

To solve the said problem about the loss rate and to eliminate the above-described restrictions of the compensated optical fiber, "waveguide-type dispersion compensators", in particular those using the optical ring resonator, have ever been studied.

The use of the optical ring resonator as optical filters has been expected and researched for a long time. The waveguide-type optical ring resonator comprises a ring-shaped or circular optical waveguide (which may be simply referred as "waveguide" hereinafter) serving as a resonant, and an input/output optical waveguide for inputting signal light into the resonator waveguide and outputting signal light therefrom. The input/output waveguide is optically coupled with the resonator waveguide in the coupling section. A directional optical coupler is formed in the coupling section to optically couple these two waveguides together. By changing the refractive index of the directional coupler to thereby change the phase of the signal light, the branching ratio of the signal light with respect to the resonator waveguide is controllable. Thus, the finesse of the ring resonator itself is made controllable. Moreover, by changing the temperature of the circular resonator waveguide, the resonant wavelength is changeable. As a result, the ring resonator is operable as a wavelength-variable optical filter.

Furthermore, in recent years, researches have been conducted to positively utilize the wavelength dispersion characteristic of the ring resonator, thereby controlling the wavelength dispersion occurring in optical fibers. This is to cancel the degradation of the pulse waveform of signal light, which is induced by the wavelength dispersion characteristic of the optical fiber used, by generating opposed wavelength dispersion to that of the fiber, thereby suppressing the optical pulse-waveform degradation.

FIG. 1 shows an example of the structure of the prior-art optical dispersion compensation devices of this type. A first paper, ECOC 2000, Munich, Post-deadline paper, written by F. Horst, C. Berendsen, R. Beyeler, G. Bona, R. Germann, H. Salemink, and D. Wiesmann, entitled "Tunable ring resonator dispersion compensators realized in high-refractive-index contrast SiON technology", discloses the optical dispersion compensation device 100 with an optical circuit formed by using the Planar Lightwave Circuit (PLC) technique.

The device 100 comprises a ring-shaped resonator waveguide 101 serving as an optical ring resonator, a linear input/output optical waveguide 102, and an optical directional coupler 103 for optically coupling the waveguides 101 and 102 to each other. The resonator waveguide 101 is made of an optical waveguide having a large refractive-index difference with respect to its surrounding material.

A plurality of the dispersion compensation devices 100 shown in FIG. 1 can be connected in cascade to each other to increase an obtainable amount of the wavelength dispersion. For example, when the four devices 100 were connected in cascade, the maximum wavelength dispersion was −3430 picosecond per nanometer (ps/nm) under the condition that the highest operable frequency was 12.5 GHz. This means that, if so, the wavelength dispersion of 200 km's worth of an ordinary optical fiber can be compensated. When the total length of the ring-shaped resonator waveguide 101 was set at approximately 4 mm, the highest operable frequency was prominently expanded to 25 GHz, in which the wavelength dispersion of 415 ps/nm was obtained With the prior-art dispersion compensation device 100 of FIG. 1, a heater 104 is additionally provided to overlap with the ring-shaped resonator waveguide 101 and the straight input/output waveguide 102 in the directional coupler 103. By supplying electric power to the heater 104 to change the temperature of the corresponding pars of the waveguides 101 and 102, the finesse of the resonator waveguide 101 (i.e., the ring resonator) is controllable. If the finesse is raised, the wavelength dispersion is increased. Contrarily, if the finesse is lowered, the wavelength dispersion is decreased The heater 104, which is located to overlap with the waveguide arms of the directional coupler 103, is provided for controlling or adjusting the wavelength of the signal light propagating in the resonator waveguide 101 by supplying electric power thereto. On the other hand, another heater 105 is provided to overlap with the remaining part of the ring-shaped waveguide 101 other than the coupler 103. The heater 105 is provided for controlling or adjusting the phase of the signal light propagating in the resonator waveguide 101 by supplying electric power thereto, thereby adjusting the finesse and wavelength dispersion.

FIG. 2 shows another example of the structure of the prior-art dispersion compensation devices. A second paper, OFC 2001, Anaheim, Calif., Post-deadline paper, PD9, written by C. K. Madsen et al., entitled "Compact Integrated Tunable Chromatic Dispersion Compensator with a 4000 ps/nm Tuning Range", which corresponds to the U.S. Pat. No. 6,289,151 issued on Sep. 11, 2001, discloses a dispersion compensation device 120 with an optical circuit formed by using the PLC technique.

Unlike the device 100 shown in FIG. 1, the device 120 shown in FIG. 2 comprises a Mach-Zehnder optical interferometer 122 introduced into an optical ring resonator 121. The interferometer 122 has two optical waveguide arms 121A and 121B, which are equal in length to each other. Thus, the interferometer 122 has a symmetrical structure with respect to its central line. The arms 121A and 121B are optically coupled to each other by way of optical directional couplers 123A and 123B. Each of the couplers 123A and 123B constitutes a 2×2 (i.e. two input and two output) optical coupler. The arms 121A and 121B are intersected to each other and then, connected to two input/output optical waveguides 124A and 124B by way of the directional couplers 123A and 123B, respectively.

With the prior-art dispersion compensation device 120 of FIG. 2, signal light propagating through one of the input/output waveguides 124A and 124B flows into the ring resonator 121 by way of the coupler 123A or 123B at a predetermined branching ratio and then, flows out of the resonator 121 by way of the coupler 123B or 123A at a predetermined branching ratio to the other of the input/output waveguides 124A and 124B.

A heater 126, which is provided to overlap with the ring resonator 121, is used for wavelength adjustment. A heater 127, which is provided to overlap with the arm 121B in the interferometer 122, is used for phase adjustment.

The finesse of the ring resonator 121 is controlled by refractive index difference between the arms 121A and 121B and/or the use of the heater 127, which resulted in the wavelength dispersion of ±1980 ps/nm. The highest operable frequency was 13.4 GHz. In the second paper, a signal transmission experiment at 10 Gb/s was carried out using the dispersion compensation device 120 of FIG. 2 and a Non Return to Zero (NRZ) signal and as a result, a fact that desired dispersion compensation characteristic and desired transmission characteristic were realizable was confirmed.

As explained above, it is understood that an optical circuit for compensating the wavelength dispersion of the optical fiber is realizable with an optical ring resonator using the PLC technique. However, with the conventional dispersion compensation devices (including the above-described prior-art dispersion compensation devices 100 and 120) using an optical ring resonator that have been reported so far, the highest operable frequency is as low as approximately 25 GHz. To shift the highest operable frequency toward the shorter wavelength (i.e., higher frequency) side, the total length of the optical ring resonator itself needs to be as short as possible.

However, with the above-described prior-art dispersion compensation devices 100 and 120, as shown in FIGS. 1 and 2, an optical coupler such as the directional coupler 103 or Mach-Zehnder interferometer 122 is provided. Since the said optical coupler necessitates a comparatively large size, a limit exists in reducing the overall waveguide length of the ring resonator 101 or 121. This limit restricts the highest operable frequency of the devices 100 and 120 to a level of approximately 25 GHz.

SUMMARY OF THE INVENTION

Accordingly, an object of the present invention is to provide an optical waveguide device that makes it possible to expand the operable or usable frequency range toward the higher frequency side, and a method of fabricating the device.

Another object of the present invention is to provide an optical waveguide device that reduces its size and its fabrication cost, and a method of fabricating the device.

Still another object of the present invention is to provide an optical waveguide device that makes it possible to cope with higher-speed optical communication, and a method of fabricating the device.

The above objects together with others not specifically mentioned will become clear to those skilled in the art from the following description.

According to a first aspect of the present invention, an optical waveguide device is provided, which comprises:

a single-mode optical resonator waveguide serving as an optical ring resonator;

a single-mode optical input/output waveguide having a first end and a second end;

input signal light being inputted into the input/output waveguide at the first end and output signal light being outputted from the input/output waveguide at the second end;

the input/output waveguide being located close to the resonator waveguide in an area;

a Mach-Zehnder interferometer formed in such a way as to include a part of the resonator waveguide as its first optical waveguide arm and a part of the input/output waveguide as its second optical waveguide arm in the area; and the interferometer having a first optical coupler for optically coupling the first waveguide arm and the second waveguide arm with an input-side part of the input/output waveguide and a remaining part of the resonator waveguide due to multiple-mode optical interference, and a second optical coupler for optically coupling the first waveguide arm and the second waveguide arm with an output-side part of the input/output waveguide and the remaining part of the resonator waveguide due to multiple-mode optical interference.

With the optical waveguide device according to the first aspect of the present invention, a single-mode optical resonator waveguide serving as an optical ring resonator and a single-mode input/output optical waveguide are provided. Input signal light is inputted into the input/output waveguide at a first end thereof. Output signal light is outputted from the input/output waveguide at a second end thereof. The input/output waveguide is located close to the resonator waveguide in an area.

Moreover, a Mach-Zehnder interferometer is formed in such a way as to include a part of the resonator waveguide as its first optical waveguide arm and a part of the input/ output waveguide as its second optical waveguide arm in the area. The interferometer has a first optical coupler for optically coupling the first waveguide arm and the second waveguide arm with an input-side part of the input/output waveguide and a remaining part of the resonator waveguide due to multiple-mode optical interference, and a second optical coupler for optically coupling the first waveguide arm and the second waveguide arm with an output-side part of the input/output waveguide and the remaining part of the resonator waveguide due to multiple-mode optical interference.

In this way, the optical waveguide device according to the first aspect of the present invention comprises the Mach-Zehnder interferometer having the first and second optical multiple-mode interference couplers to optically couple the resonator waveguide and the input/output waveguides with each other. This means that the optically coupling section for optically coupling the resonator and input/output waveguides can be downsized easily. Accordingly, the remaining part of the resonator waveguide other than the first waveguide arm and the first and second couplers can be set relatively longer compared with the above-described prior-art device 100 shown in FIG. 1 and therefore, the total length of the resonator waveguide serving as the optical resonator can be decreased. As a result, the operable or usable frequency range is expandable to the higher-frequency side, for example, to approximately 60 GHz or higher. This leads to higher-speed optical communication than before.

Furthermore, since the total length of the resonator waveguide can be decreased, the device itself can be downsized and at the same time, the fabrication cost of the device itself can be reduced.

According to a second aspect of the present invention, another optical waveguide device, which comprises:

an optical resonator waveguide serving as an optical ring resonator;

an input/output optical waveguide having a first end and a second end;

input signal light being inputted into the input/output waveguide at the first end and output signal light being outputted from the input/output waveguide at the second end;

the input/output waveguide being located close to the resonator waveguide in an area;

a Mach-Zehnder interferometer formed in such a way as to include a part of the resonator waveguide as its first optical waveguide arm and a part of the input/output waveguide as its second optical waveguide arm in the area; and the interferometer having a first optical coupler with a first multiple-mode optical waveguide region in which multiple-mode optical interference occurs, and a second optical coupler with a second multiple-mode optical waveguide region in which multiple-mode optical interference occurs;

wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an input-side part of the input/output waveguide and a remaining part of the resonator waveguide are optically connected to the first multiple-mode waveguide region on its second connection side while an output-side part of the input/output waveguide and the remaining part of the resonator waveguide are optically connected to the second multiple-mode waveguide region on its second connection side.

With the optical waveguide device according to the second aspect of the present invention, the Mach-Zehnder interferometer having the first and second optical multiple-mode interference couplers is provided to optically couple the resonator waveguide and the input/output waveguide with each other. This means that the optically coupling section for optically coupling the resonator and input/output waveguides can be downsized easily. Accordingly, the remaining part of the resonator waveguide other than the first waveguide arm and the first and second couplers can be set relatively longer compared with the above-described prior-art device 100 shown in FIG. 1 and therefore, the total length of the resonator waveguide can be decreased. As a result, the operable or usable frequency range is expandable to the higher frequency side, for example, to approximately 60 GHz or higher. This leads to higher-speed optical communication than before.

Furthermore, since the total length of the resonator waveguide can be decreased, the device itself can be downsized and at the same time, the fabrication cost of the device itself can be reduced.

According to a third aspect of the present invention, still another optical waveguide device, which comprises:

a Mach-Zehnder interferometer including a first optical coupler, a second optical coupler, a first optical waveguide arm connecting the first coupler with the second coupler, and a second optical waveguide arm connecting the first coupler with the second coupler in such a way as to intersect the first waveguide arm;

the first coupler having a first multiple-mode optical waveguide region in which multiple-mode optical interference occurs;

the second coupler having a second multiple-mode optical waveguide region in which multiple-mode optical interference occurs;

an optical resonator waveguide serving as an optical ring resonator, connected in such a way that an end of the resonator waveguide is connected to the first coupler and the other end thereof is connected to the second coupler;

an optical input waveguide connected in such a way that an end of the input waveguide is connected to the first coupler; and an optical output waveguide connected in such a way that an end of the output waveguide is connected to the second coupler;

wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an end of the input waveguide is optically connected to the first multiple-mode waveguide region on its second connection side while an end of the output waveguide is optically connected to the second multiple-mode waveguide region on its second connection side.

With the optical waveguide device according to the third aspect of the present invention, the Mach-Zehnder interferometer having the first and second optical multiple-mode interference couplers is provided to optically couple the resonator waveguide with the input and output waveguides. This means that the optically coupling sections for optically coupling the resonator waveguide with the input and output waveguides can be downsized easily. Accordingly, the resonator waveguide and the first and second waveguide arms can be set relatively longer compared with the above-described prior-art device 120 shown in FIG. 2 and therefore, the total length of the resonator waveguide and the first and second waveguide arms can be decreased. As a result, the operable or usable frequency range is expandable to the higher frequency side, for example, to approximately 60 GHz or higher. This leads to higher-speed optical communication than before.

Furthermore, since the total length of the resonator waveguide and the first and second waveguide arms can be decreased, the device itself can be downsized and at the same time, the fabrication cost of the device itself can be reduced.

In a preferred embodiment of the devices according to the first to third aspects of the invention, a temperature controller is additionally provided to control a temperature of at least one of the first and second waveguide arms of the interferometer, thereby controlling a phase of signal light propagating in the interferometer. The temperature controller is formed to overlap with the at least one of the first and second waveguide arms. In this embodiment, there is an additional advantage that the finesse and the obtainable wavelength dispersion are controllable by way of controlling the phase of the signal light propagating in the interferometer.

In another preferred embodiment of the devices according to the first to third aspects of the invention, a temperature controller is additionally provided to control a temperature of the resonator waveguide, thereby controlling a wavelength of signal light propagating in the resonator waveguide. The temperature controller is formed to overlap with the resonator waveguide. In this embodiment, there is an additional advantage that the resonance frequency is tunable by way of controlling the wavelength of the signal light propagating in the resonator waveguide.

In still another preferred embodiment of the devices according to the first to third aspects of the invention, the resonator waveguide is made of a material having a refractive index greater than that of a material surrounding the resonator waveguide by 4% or greater. In this embodiment, there is an additional advantage that the resonator waveguide can be formed in such a way as to have a less radius of curvature.

In a further preferred embodiment of the devices according to the first to third aspects of the invention, a total length of the resonator waveguide is determined in such a way that an operable frequency is 25 GHz or greater. In this embodiment, there is an additional advantage that an operable frequency of 25 GHz or greater is realizable.

In a still further preferred embodiment of the devices according to the first to third aspects of the invention, the resonator waveguide, the input/output waveguide, and the interferometer constitute a first optical resonator section. At least one additional optical resonator section having a same configuration as the first resonator section is additionally provided in such a way as to be connected in cascade to the first resonator section. In this embodiment, there is an additional advantage that the obtainable advantages of the invention are enhanced.

According to a fourth aspect of the present invention, a further optical waveguide device, which comprises:

a Mach-Zehnder interferometer including a first optical coupler, a second optical coupler, a third optical coupler located between the first coupler and the second coupler, a first optical waveguide arm connecting the first coupler with the third coupler, a second optical waveguide arm connecting the first coupler with the third coupler in such a way as not to intersect the first waveguide arm, a third optical waveguide arm connecting the second coupler with the third coupler, a fourth optical waveguide arm connecting the second coupler with the third coupler in such a way as not to intersect the third waveguide arm;

the first coupler having a first multiple-mode optical waveguide region in which multiple-mode optical interference occurs;

the second coupler having a second multiple-mode optical waveguide region in which multiple-mode optical interference occurs;

the third coupler having a third multiple-mode optical waveguide region in which multiple-mode optical interference occurs;

an optical resonator waveguide serving as an optical ring resonator, connected in such a way that an end of the first waveguide is connected to the first coupler and the other end thereof is connected to the second coupler;

an optical input waveguide connected in such a way that an end of the input waveguide is connected to the first coupler; and an optical output waveguide connected in such a way that an end of the output waveguide is connected to the second coupler;

wherein an end of the first waveguide arm and an end of the second waveguide arm are optically connected to the first multiple-mode waveguide region on its first connection side while the other end of the first waveguide arm and the other end of the second waveguide arm are optically connected to the third multiple-mode waveguide region on its first connection side;

and wherein an end of the third waveguide arm and an end of the fourth waveguide arm are optically connected to the second multiple-mode waveguide region on its first connection side while the other end of the third waveguide arm and the other end of the fourth waveguide arm are optically connected to the third multiple-mode waveguide region on its second connection side;

and wherein an end of the input waveguide is optically connected to the first multiple-mode waveguide region on its second connection side while an end of the output waveguide is optically connected to the second multiple-mode waveguide region on its second connection side.

With the optical waveguide device according to the fourth aspect of the present invention, the Mach-Zehnder interferometer having the first to third optical multiple-mode interference couplers is provided to optically couple the resonator waveguide with the input and output waveguide. This means that the optically coupling sections for optically coupling the resonator waveguide with the input and output waveguides can be downsized easily. Accordingly, the resonator waveguide and the first and second waveguide arms can be set relatively longer compared with the above-described prior-art devices 100 and 120 shown in FIGS. 1 and 2 and therefore, the total length of the resonator waveguide and the first to fourth waveguide arms can be decreased. As a result, the operable or usable frequency range is expandable to the higher frequency side, for example, to approximately 60 GHz or higher. This leads to higher-speed optical communication than before.

Furthermore, since the total length of the resonator waveguide and the first to fourth waveguide arms can be decreased, the device itself can be downsized and at the same time, the fabrication cost of the device itself can be reduced.

In a preferred embodiment of the device according to the fourth aspect of the invention, a temperature controller is additionally provided to control a temperature of at least one of the first to fourth waveguide arms of the interferometer, thereby controlling a phase of signal light propagating in the interferometer. The temperature controller is formed to overlap with the at least one of the first to fourth waveguide arms. In this embodiment, there is an additional advantage that the finesse and the obtainable wavelength dispersion are controllable by way of controlling the phase of the signal light propagating in the interferometer.

In another preferred embodiment of the device according to the fourth aspect of the invention, a temperature controller is additionally provided to control a temperature of the remaining part of the resonator waveguide, thereby controlling a wavelength of signal light propagating in the resonator waveguide. The temperature controller is formed to overlap with the remaining part of the resonator waveguide. In this embodiment, there is an additional advantage that the resonance frequency is tunable by way of controlling the wavelength of the signal light propagating in the resonator waveguide.

In still another preferred embodiment of the device according to the fourth aspect of the invention, the resonator waveguide is made of a material having a refractive index greater than that of a material surrounding the resonator waveguide by 4% or greater. In this embodiment, there is an additional advantage that the resonator waveguide can be formed in such a way as to have a less radius of curvature.

In a further preferred embodiment of the device according to the fourth aspect of the invention, a total length of the resonator waveguide is determined in such a way that an operable frequency is 25 GHz or greater. In this embodiment, there is an additional advantage that an operable frequency of 25 GHz or greater is realizable.

In a still further preferred embodiment of the device according to the fourth aspect of the invention, the resonator waveguide, the input/output waveguide, and the interferometer constitute a first optical resonator section. At least one additional optical resonator section having a same configuration as the first resonator section is additionally provided in such a way as to be connected in cascade to the first resonator section. In this embodiment, there is an additional advantage that the obtainable advantages of the invention are enhanced.

According to a fifth aspect of the present invention, a method of fabricating an optical waveguide device is provided, which comprises the steps of:

forming an under-cladding layer with a first material over a substrate;

forming a core layer on the under-cladding layer with a second material having a refractive index greater than that of the first material; and patterning the core layer in such a way as to form a single-mode optical resonator waveguide serving as an optical ring resonator, a single-mode optical input/output waveguide having a first end and a second end, and a Mach-Zehnder interferometer;

wherein input signal light is inputted into the input/output waveguide at the first end and output signal light is outputted from the input/output waveguide at the second end;

and wherein the input/output waveguide is located close to the resonator waveguide in an area;

and wherein the interferometer is formed in such a way as to include a part of the resonator waveguide as its first optical waveguide arm and a part of the input/output waveguide as its second optical waveguide arm in the area;

and wherein the interferometer has a first optical coupler for optically coupling the first waveguide arm and the second waveguide arm with an input-side part of the input/output waveguide and a remaining part of the resonator waveguide due to multiple-mode optical interference; and a second optical coupler for optically coupling the first waveguide arm and the second waveguide arm with an output-side part of the input/output waveguide and the remaining part of the resonator waveguide due to multiple-mode optical interference.

With the method according to the fifth aspect of the present invention, it is clear that the above-described optical waveguide device according to the first aspect can be fabricated using the PLC technique.

According to a sixth aspect of the present invention, another method of fabricating an optical waveguide device is provided, which comprises the steps of:

forming an under-cladding layer with a first material over a substrate;

forming a core layer on the under-cladding layer with a second material having a refractive index greater than that of the first material; and patterning the core layer in such a way as to form an optical resonator waveguide serving as an optical ring resonator, an input/output optical waveguide having a first end and a second end, and a Mach-Zehnder interferometer;

wherein input signal light is inputted into the input/output waveguide at the first end and output signal light is outputted from the input/output waveguide at the second end;

and wherein the input/output waveguide is located close to the resonator waveguide in an area;

and wherein the Mach-Zehnder interferometer is formed in such a way as to include a part of the resonator waveguide as its first optical waveguide arm and a part of the input/output waveguide as its second optical waveguide arm in the area;

and wherein the interferometer has a first optical coupler with a first multiple-mode optical waveguide region in which multiple-mode optical interference occurs, and a second optical coupler with a second multiple-mode optical waveguide region in which multiple-mode optical interference occurs;

wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an input-side part of the input/output waveguide and a remaining part of the resonator waveguide are optically connected to the first multiple-mode waveguide region on its second connection side while an output-side part of the input/output waveguide and the remaining part of the resonator waveguide are optically connected to the second multiple-mode waveguide region on its second connection side.

With the method according to the sixth aspect of the present invention, it is clear that the above-described optical waveguide device according to the second aspect can be fabricated using the PLC technique.

According to a seventh aspect of the present invention, still another method of fabricating an optical waveguide device is provided, which comprises the steps of:

forming an under-cladding layer with a first material over a substrate;

forming a core layer on the under-cladding layer with a second material having a refractive index greater than that of the first material; and patterning the core layer in such a way as to form a Mach-Zehnder interferometer, an optical resonator waveguide serving as an optical ring resonator, and an optical input waveguide, and an optical output waveguide;

wherein the interferometer includes a first optical coupler, a second optical coupler, a first optical waveguide arm connecting the first coupler with the second coupler, and a second optical waveguide arm connecting the first coupler with the second coupler in such a way as to intersect the first waveguide arm;

and wherein the first coupler has a first multiple-mode optical waveguide region in which multiple-mode optical interference occurs;

and wherein the second coupler has a second multiple-mode optical waveguide region kin which multiple-mode optical interference occurs;

and wherein the resonator waveguide is connected in such a way that an end of the resonator waveguide is connected to the first coupler and the other end thereof is connected to the second coupler;

and wherein the input waveguide is connected in such a way that an end of the input waveguide is connected to the first coupler;

and wherein the output waveguide is connected in such a way that an end of the output waveguide is connected to the second coupler;

and wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an end of the input waveguide is optically connected to the first multiple-mode waveguide region on its second connection side while an end of the output waveguide is optically connected to the second multiple-mode waveguide region on its second connection side.

With the method according to the seventh aspect of the present invention, it is clear that the above-described optical waveguide device according to the third aspect can be fabricated using the PLC technique.

In a preferred embodiment of the methods according to the fifth to seventh aspects of the invention, a step of forming an upper-cladding layer to cover the patterned core layer, a step of forming a heater layer on the upper-cladding layer, and a step of patterning the heater layer to form a temperature controller in such a way as to overlap with at least one of the first and second waveguide arms of the interferometer are additionally provided. The temperature controller is to control a temperature of the at least one of the first and second waveguide arms, thereby controlling a phase of signal light propagating in the interferometer.

The temperature controller may be formed to entirely or partially cover the at least one of the first and second waveguide arms.

In another preferred embodiment of the methods according to the fifth to seventh aspects of the invention, a step of forming an upper-cladding layer to cover the patterned core layer, a step of forming a heater layer on the upper-cladding layer, and a step of patterning the heater layer to form a temperature controller in such a way as to overlap with the resonator waveguide are additionally provided. The temperature controller is to control a temperature of the resonator waveguide, thereby controlling a wavelength of signal light propagating in the resonator waveguide.

The temperature controller may be formed to entirely or partially cover the remaining part of the resonator waveguide.

According to an eighth aspect of the present invention, a further method of fabricating an optical waveguide device is provided, which comprises the steps of:

forming an under-cladding layer with a first material over a substrate;

forming a core layer on the under-cladding layer with a second material having a refractive index greater than that of the first material; and patterning the core layer in such a way as to form a Mach-Zehnder interferometer, an optical resonator waveguide serving as an optical ring resonator, an optical input waveguide, and an optical output waveguide;

wherein the interferometer includes a first optical coupler, a second optical coupler, a third optical coupler located between the first coupler and the second coupler, a first optical waveguide arm connecting the first coupler with the third coupler, a second optical waveguide arm connecting the first coupler with the third coupler in such a way as not to intersect the first waveguide arm, a third optical waveguide arm connecting the second coupler with the third coupler, a fourth optical waveguide arm connecting the second coupler with the third coupler in such a way as not to intersect the third waveguide arm;

and wherein the first coupler has a first multiple-mode optical waveguide region in which multiple-mode optical interference occurs;

and wherein the second coupler has a second multiple-mode optical waveguide region in which multiple-mode optical interference occurs;

and wherein the third coupler has a third multiple-mode optical waveguide region in which multiple-mode optical interference occurs;

and wherein the resonator waveguide is connected in such a way that an end of the first waveguide is connected to the first coupler and the other end thereof is connected to the second coupler;

and wherein the input waveguide is connected in such a way that an end of the input waveguide is connected to the first coupler;

and wherein the output waveguide is connected in such a way that an end of the output waveguide is connected to the second coupler;

and wherein an end of the first waveguide arm and an end of the second waveguide arm are optically connected to the first multiple-mode waveguide region on its first connection side while the other end of the first waveguide arm and the other end of the second waveguide arm are optically connected to the third multiple-mode waveguide region on its first connection side;

and wherein an end of the third waveguide arm and an end of the fourth waveguide arm are optically connected to the second multiple-mode waveguide region on its first connection side while the other end of the third waveguide arm and the other end of the fourth waveguide arm are optically connected to the third multiple-mode waveguide region on its second connection side;

and wherein an end of the input waveguide is optically connected to the first multiple-mode waveguide region on its second connection side while an end of the output waveguide is optically connected to the second multiple-mode waveguide region on its second connection side.

With the method according to the eighth aspect of the present invention, it is clear that the above-described optical waveguide device according to the fourth aspect can be fabricated using the PLC technique.

In a preferred embodiment of the method according to the eighth aspect of the invention, a step of forming an upper-cladding layer to cover the patterned core layer, a step of forming a heater layer on the upper-cladding layer, and a step of patterning the heater layer to form a temperature controller in such a way as to overlap with at least one of the first, second, third, and fourth waveguide arms of the interferometer are additionally provided. The temperature controller is to control a temperature of the at least one of the first, second, third, and fourth waveguide arms, thereby controlling a phase of signal light propagating in the interferometer.

The temperature controller may be formed to entirely or partially Cover the at least one of the first to fourth waveguide arms.

In another preferred embodiment of the method according to the eighth aspect of the invention, a step of forming an upper-cladding layer to cover the patterned core layer, a step of forming a heater layer on the upper-cladding layer, and a step of patterning the heater layer to form a temperature controller in such a way as to overlap with the resonator waveguide are additionally provided. The temperature controller is to control a temperature of the resonator waveguide, thereby controlling a wavelength of signal light propagating in the resonator waveguide.

The temperature controller may be formed to entirely or partially cover the resonator waveguide.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
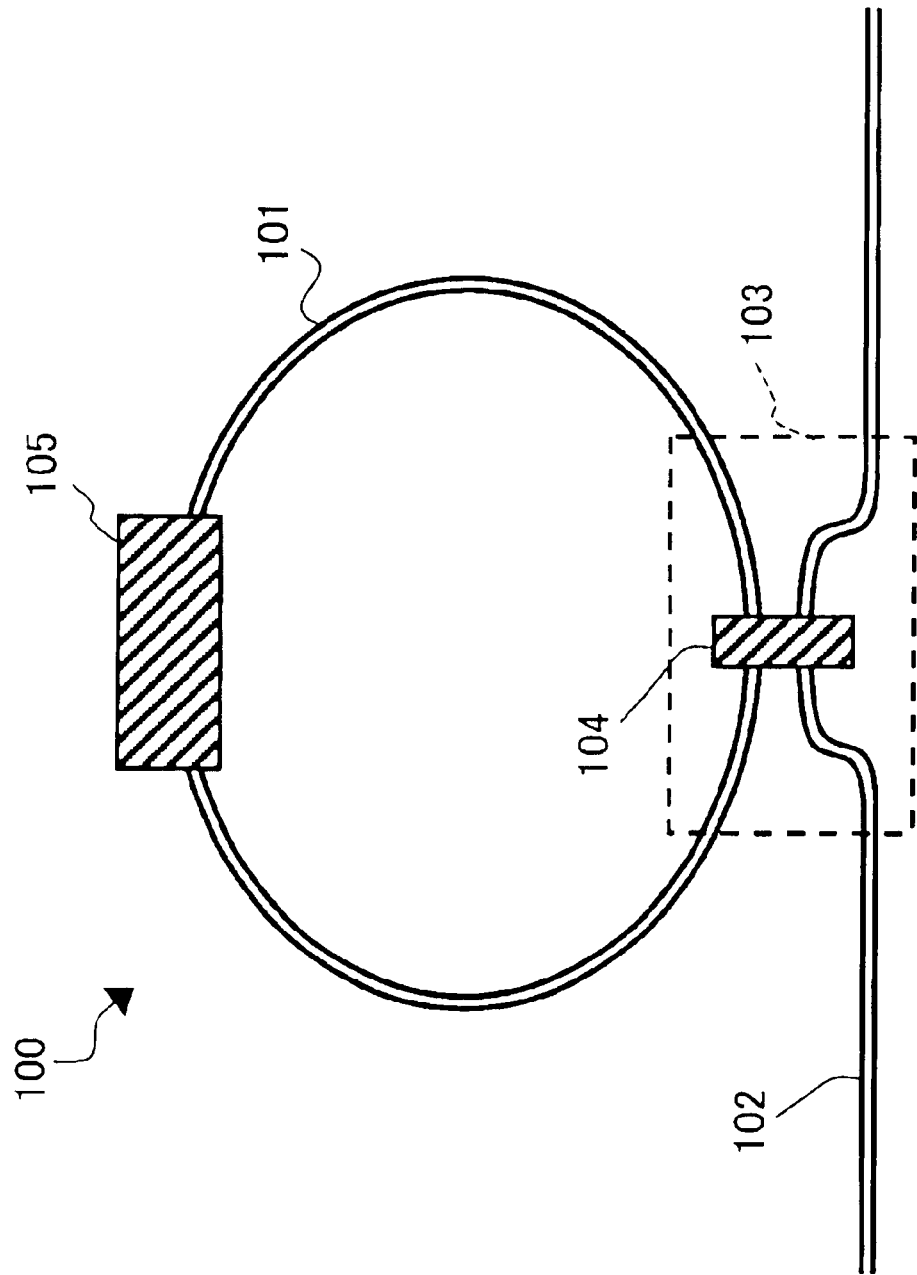
FIG. 1 is a schematic plan view showing the structure of a prior-art optical dispersion compensation device.

Preferred embodiments of the present invention will be described in detail below while referring to the drawings attached.

First Embodiment

Figure 3:
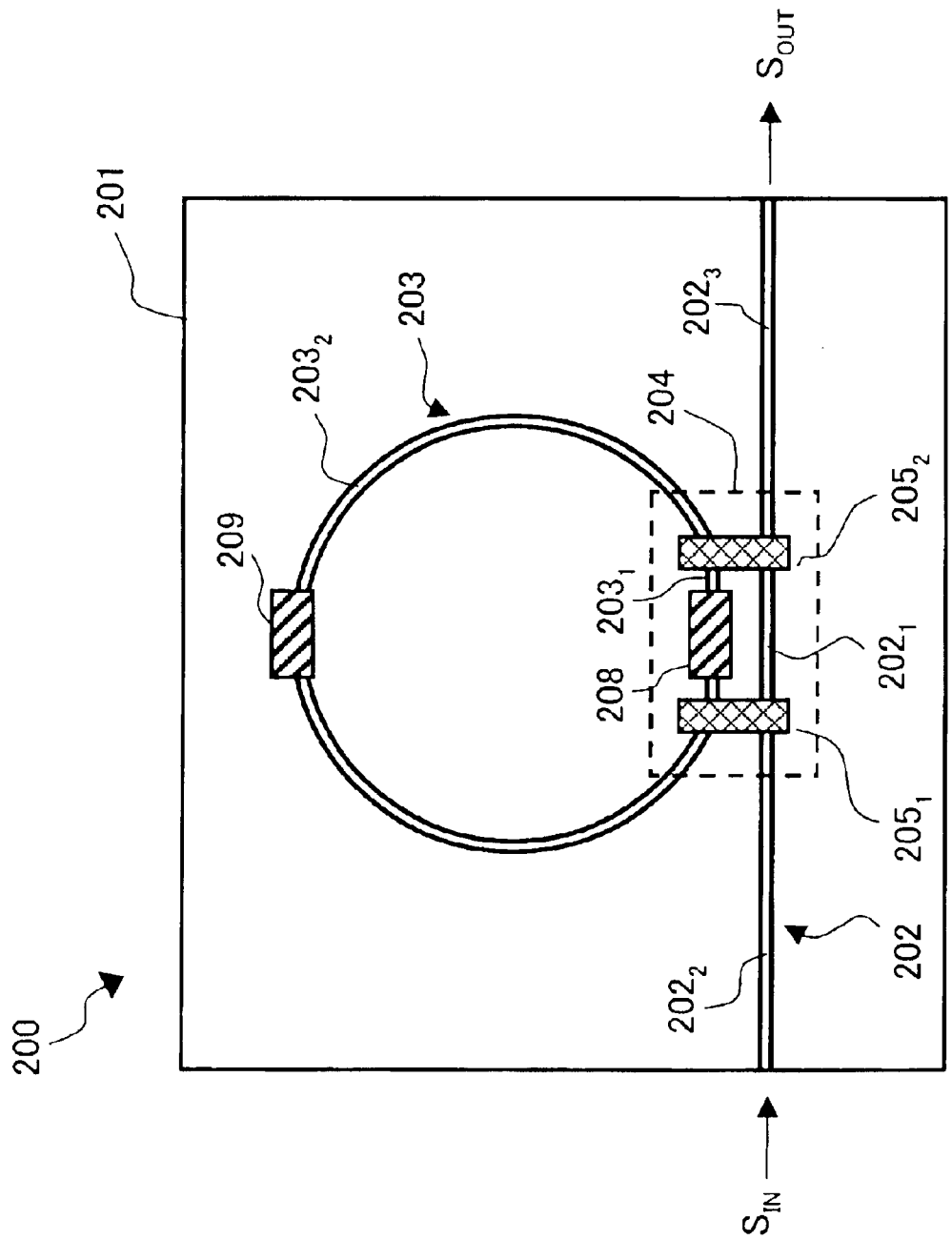
FIG. 3 is a schematic plan view showing the structure of an optical waveguide device according to a first embodiment of the invention, in which the device is configured as an optical dispersion compensation device.

As shown in FIG. 3, an optical waveguide device 200 according to a first embodiment of the invention comprises an optical waveguide substrate 201, a linear optical input/output waveguide 202, a circular or ring-shaped optical resonator waveguide 203, and a Mach-Zehnder interferometer 204. The linear input/output waveguide 202, the circular resonator waveguide 203, and the interferometer 204 are formed on the substrate 201. The resonator waveguide 203 serves as an optical ring resonator. The interferometer 204 optically interconnects the input/output waveguide 202 and the resonator waveguide 203 with each other. Here, the device 200 is configured as an optical dispersion compensation device.

The Mach-Zehnder interferometer 204 is formed by first and second multi-mode interference (MMI) optical couplers 205$_1$ and 205$_2$ and first and second optical waveguide arms 202$_1$ and 203$_1$. The first waveguide arm 202$_1$ is a part of the linear waveguide (i.e., the input/output waveguide) 202. The second waveguide arm $203_1$ is a part of the circular waveguide (i.e., the resonator waveguide) 203.

A heater 208 for phase adjustment or control is formed to overlap with the first waveguide arm $203_1$ in the interferometer 204. A heater 209 for wavelength adjustment or control is formed to overlap with the remaining part $203_2$ of the resonator waveguide 203, which is located outside the interferometer 204.

An input-side part $202_2$ of the input/output waveguide 202, which is located on the left side in FIG. 3, serves as an input waveguide. A remaining output-side part $202_3$ of the input/output waveguide 202, which is located on the right side in FIG. 3, serves as an output waveguide.

Figure 4A:
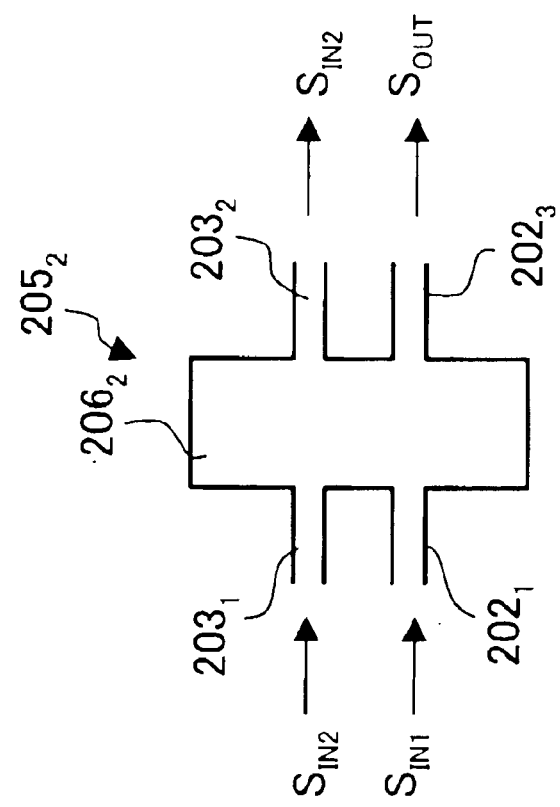
FIGS. 4A and 4B are schematic plan views showing the interconnection structure of the first and second multi-mode interference optical couplers of the Mach-Zehnder interferometer with the optical input/output waveguide and the optical resonator waveguide in the optical waveguide device according to the first embodiment of FIG. 3, respectively.
Figure 4B:
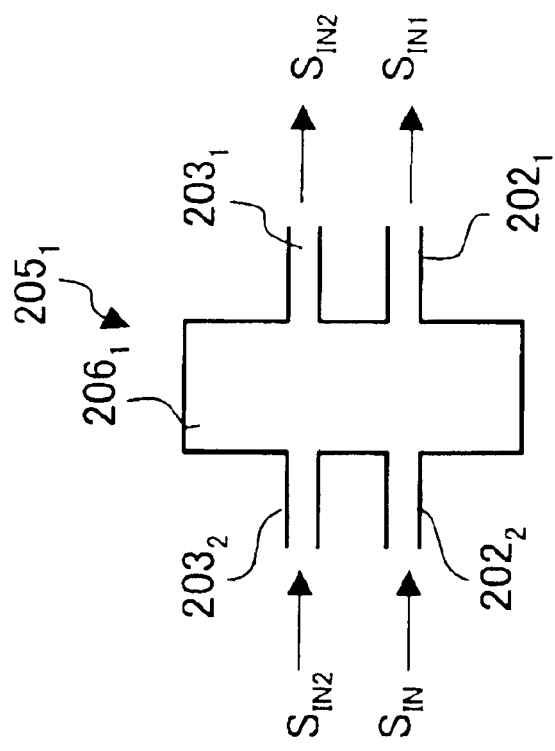

FIG. 4A shows the interconnection structure of the first MMI optical coupler $205_1$ with the input/output waveguide 202 and the resonator waveguide 203 in the optical waveguide device 200. FIG. 4B shows the interconnection structure of the second MMI optical coupler $205_2$ with the input/output waveguide 202 and the resonator waveguide 203 in the optical waveguide device 200.

As seen from FIGS. 4A and 4B, the first and second MMI optical couplers $205_1$ and $205_2$ have MMI optical waveguide regions $206_1$ and $206_2$, respectively. Each of the waveguide regions $206_1$ and $206_2$, which has four ports, has a large width in such a way that optical multiple-mode interference occurs in the waveguide region $206_1$ or $206_2$.

As shown in FIG. 4A, on one side (i.e., on the left side in FIG. 4A) of the MMI optical waveguide region $206_1$ of the first MMI coupler $205_1$, an end of the input-side part $202_2$ of the input/output waveguide 202 and an end of the remaining part $203_2$ of the resonator waveguide 203 are connected to the corresponding ports of the waveguide region $206_1$, respectively. On the other side (i.e., on the right side in FIG. 4) of the waveguide region $206_1$ of the first MMI coupler $205_1$, an end of the first waveguide arm $202_1$ formed by the part of the input/output waveguide 202 and an end of the second waveguide arm $203_1$ formed by the part of the resonator waveguide 203 are connected to the corresponding ports of the waveguide region $206_1$, respectively.

The width of the waveguide region $206_1$ of the first MMI coupler $205_1$ is larger than the sum of the widths of the input-side part $202_2$ of the input/output waveguide 202 and the remaining part $203_2$ of the resonator waveguide 203. The width of the waveguide region $206_1$ of the first MMI coupler $205_1$ is larger than the sum of the widths of the first and second waveguide arms $202_1$ and $203_1$.

Similarly, as shown in FIG. 4B, on One side (i.e., on the right side in FIG. 4B) of the MMI optical waveguide region $206_2$ of the second MMI coupler $205_2$, an end of the output-side part $202_3$ of the input/output waveguide 202 and an end of the remaining part $203_2$ of the resonator waveguide 203 are connected to the corresponding ports of the waveguide region $206_2$, respectively. On the other side (i.e., on the left side in FIG. 4B) of the MMI optical waveguide region $206_2$ of the second MMI coupler $205_2$, the other end of the first waveguide arm $202_1$ and the other end of the second waveguide arm $203_1$ are connected to the corresponding ports of the waveguide region $206_2$, respectively.

The width of the MMI optical waveguide region $206_2$ of the second MMI coupler $205_2$ is larger than the sum of the widths of the output-side part $202_3$ of the input/output waveguide 202 and the remaining part $203_2$ of the resonator waveguide 203. The width of the MMI optical waveguide region $206_2$ of the second MMI coupler $205_2$ is larger than the sum of the widths of the first and second waveguide arms $202_1$ and $203_1$.

Figure 2:
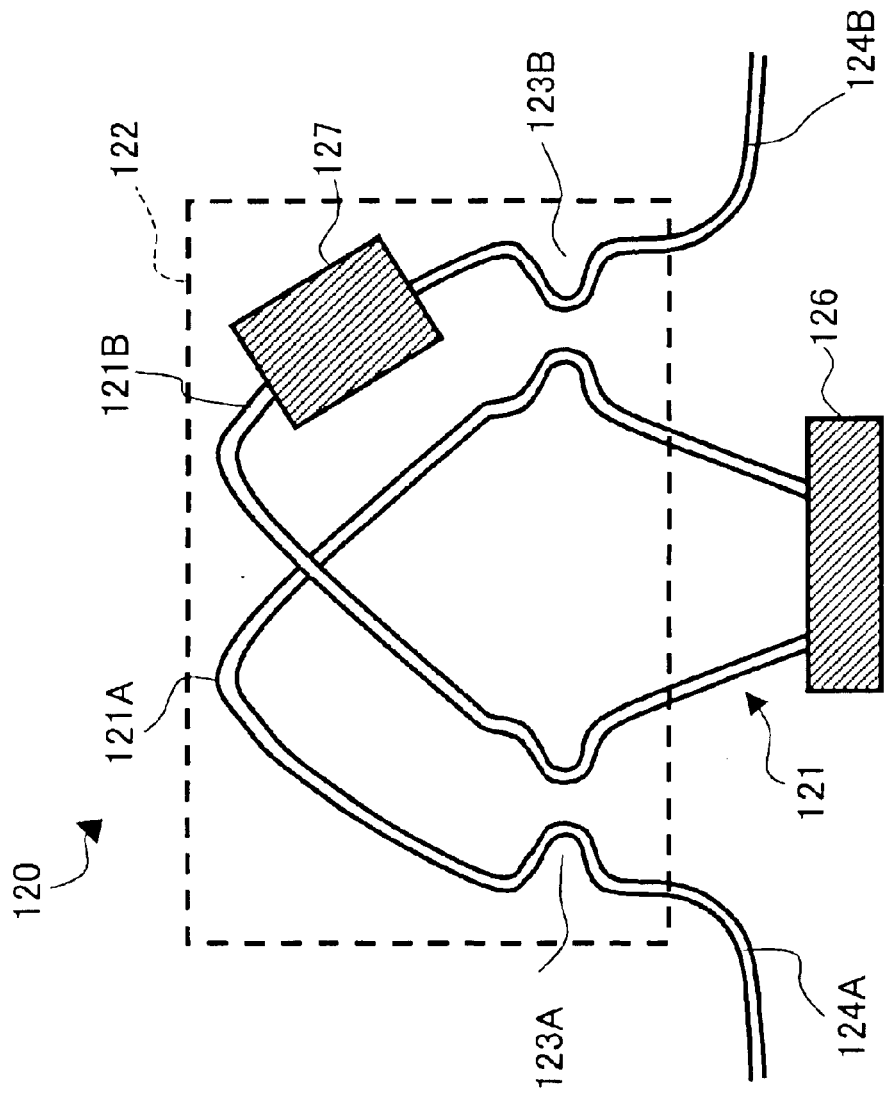
FIG. 2 is a schematic plan view showing the structure of another prior-art optical dispersion compensation device.

The operation of the optical waveguide device 200 according to the first embodiment of FIG. 3 is approximately the same as that of the prior-art dispersion compensation devices 100 and 120 shown in FIGS. 1 and 2. Specifically, input signal light $S_{IN}$ is applied to the input end of the input/output waveguide 202. The input signal light $S_{IN}$ propagates through the same waveguide 202 toward the output end of the waveguide 202. Then, the input signal light $S_{IN}$ having been propagating through the input-side part $202_2$ of the waveguide 202 (i.e., the input waveguide) flows into the ring-shaped resonator waveguide 203 at a predetermined branching ratio by way of the first MMI coupler $205_1$, thereby generating two branched input signal light $S_{IN1}$ and $S_{IN2}$. The two branched input signal light $S_{IN1}$ and $S_{IN2}$ thus generated propagates through the first and second waveguide arms $202_1$ and $203_1$, respectively, as shown in FIG. 4A. Thereafter, the branched signal light $S_{IN2}$ circulates repeatedly in the ring-shaped resonator waveguide 203 along the same, causing an optical resonance. A part of the branched signal light $S_{IN2}$ having been circulating in the resonator waveguide 203 flows out of the same waveguide 203 to the output-side part $202_3$ of the input/output waveguide 202 at a predetermined branching ratio by way of the second MMI coupler $205_2$, as shown in FIG. 4B. Thus, the branched input signal light $S_{IN1}$ and $S_{IN2}$ are combined together again, thereby generating output signal light $S_{OUT}$. The output signal light $S_{OUT}$ thus generated propagates through the output-side part $202_3$ of the input/output waveguide 202 (i.e., the output waveguide) and derived from the output end of the waveguide 202.

The overall or total length of the ring-shaped resonator waveguide 203 is much shorter than the wavelength of the pulses of the input signal light $S_{IN}$. Therefore, the input signal light $S_{IN}$ having entered the resonator waveguide 203 will cause optical interference when repeatedly circulating through the waveguide 203. As a result, the delay time of the input signal light $S_{IN}$ will change periodically according to its wavelength. By utilizing the negative dispersion characteristic induced by the periodic change of the delay time, the dispersion of the input signal light $S_{IN}$ that has been propagating through the input-side part $202_2$ of the input/output waveguide 202 can be compensated.

With the optical waveguide device 200 according to the first embodiment of FIG. 3, the Mach-Zehnder interferometer 204 is constituted by the first and second MMI couplers $205_1$ and $205_2$ and the first and second waveguide arms $202_1$ and $203_1$. The MMI couplers $205_1$ and $205_2$ can be downsized compared with the optical directional couplers 103, 123A and 123B used in the previously-described prior-art devices 100 and 120. Therefore, the overall length of the ring-shaped resonator waveguide 203 is decreased and accordingly, the objects of the invention are accomplished as explained later.

FIGS. 5A to 5D show the process steps of a method of fabricating the optical waveguide device 200 according to the first embodiment of FIG. 3, respectively.

Figure 5A:
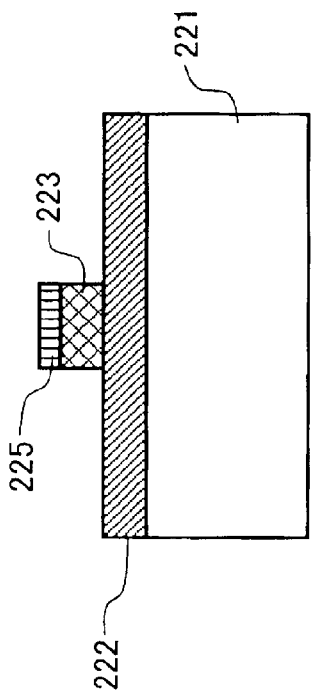
FIGS. 5A to 5D are schematic cross-sectional views showing the process steps of a method or fabricating the optical waveguide device according to the first embodiment of FIG. 3, respectively.

First, as shown in FIG. 5A, an under cladding layer 222 with a thickness of 15 μm is formed on the surface of a single-crystal silicon (Si) substrate 221 and then, a core layer 223 with a thickness of 4 μm is formed on the under cladding layer 222 thus formed. Each of the layers 221 and 222 is formed by a Atmospheric-Pressure Chemical Vapor Deposition (APCVD) process. The under-cladding layer 222 is made of a silica or quartz glass doped with germanium (Ge)

and phosphorus (P), i.e., germanium and phosphorus doped silica glass (GPSG). The core layer 223 is made of silicon oxynitride (SiON). The refractive-index difference Δ between the layers 222 and 223 is set at approximately 4%. The state at this stage is shown in FIG. 5A.

Figure 5B:
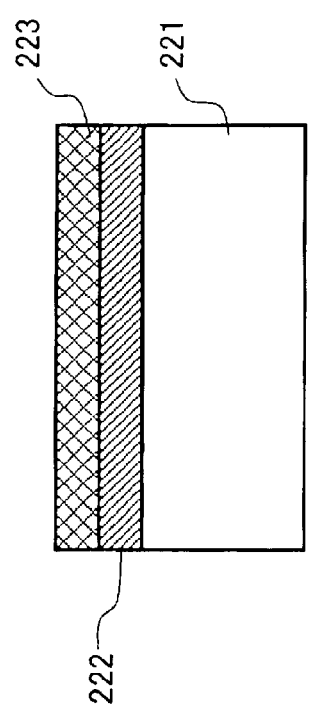

Subsequently, a chromium (Cr) layer 225 is formed on the core layer 223 by an evaporation process. After a resist layer (not shown) for patterning the Cr layer 225 is formed on the layer 225 by coating, the resist layer is patterned by lithography to have a desired plan shape. Using the resist payer thus patterned as a mask, the Cr layer 225 is selectively etched by a dry etching process to have a pattern corresponding to the desired waveguides. The state at this stage is shown in FIG. 5B, where the patterned Cr layer 225 is located on the core layer 223.

Figure 5C:
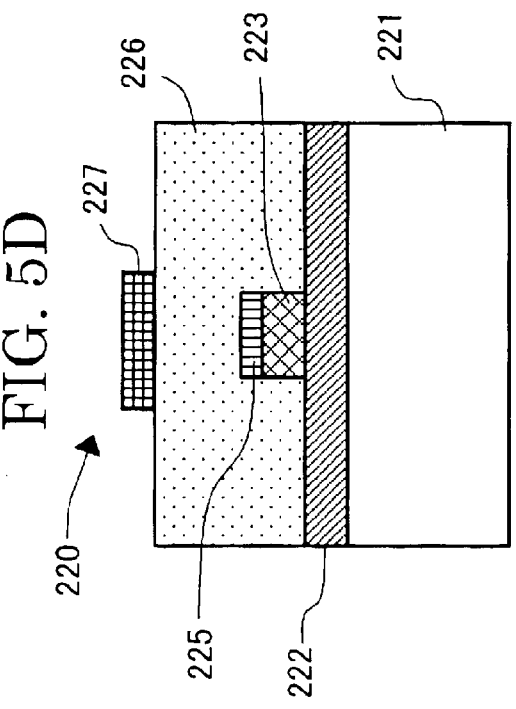

Thereafter, using the patterned Cr layer 225 as a mask, the core layer 223 is selectively etched by a Reactive Ion Etching (RIE) process until the surface of the under cladding layer 222 is exposed (i.e., until the core layer 223 is penetrated). Thus, the core layer 223 is selectively left only below the patterned Cr layer 225. In other words, the core layer 223 is selectively removed in such a way as to have a plan shape corresponding to the desired waveguides. The state at this stage is shown in FIG. 5C.

Figure 5D:
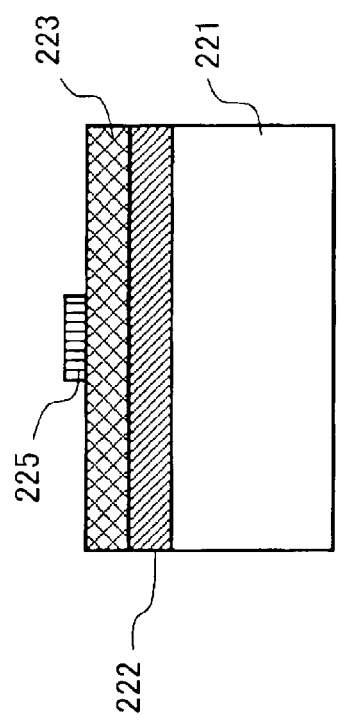

Over the substrate 221 having the above-described structure, an upper cladding layer 226 with a thickness of 10 μm is then formed by a CVD process in such a way as to cover the whole surface of the substrate 221, as shown in FIG. 5D. The upper cladding layer 226, which is made of GPSG, covers the exposed surface of the under cladding layer 222, the side faces of the remaining under cladding layer 223, and the surface and the side faces of the core layer 225.

After the surface of the upper cladding layer 226 is planarized, a heater layer 227 is formed on the surface of the upper cladding layer 226 over the whole substrate 221 by an evaporation process. The heater layer 227 thus formed is made of an alloy of platinum (Pt) and gold (Au), i.e., PtAu. The heater layer 227 is used to form the heaters 208 and 209 and to make the refractive index of the upper cladding layer 226 partially changeable. Then, the heater layer 227 is selectively etched by photolithography and etching processes, thereby selectively removing the undesired parts of the layer 227. In this way, the optical waveguide device 220 according to the first embodiment of FIG. 3 is fabricated, as shown in FIG. 5D.

The patterned core layer 223 forms the cores of the input/output waveguide 202, the resonator waveguide 203, and the first and second MMI couplers $205_1$ and $205_2$. The patterned heater layer 227 forms the heater 208 for phase adjustment and the heater 209 for wavelength adjustment.

In this embodiment, the cores of the input/output waveguide 202, the resonator waveguide 203, and the first and second MMI couplers $205_1$ and $205_2$ are simultaneously formed with the patterned core layer 223 through the same processes. However, the invention is not limited to this. These cores may be formed through separate processes.

With the optical waveguide device 200 according to the first embodiment thus fabricated, the ring-shaped resonator waveguide 203 has a total or overall length of 2 mm and the obtainable Free Spectral Range (FSR) is 100 GHz. Here, "FSR" means the interval between the peaks formed at respective resonance frequencies in an optical resonance spectrum of an optical resonator. When the total length of the ring-shaped resonator waveguide 203, the refractive index of the waveguide 203, and the velocity of light are defined as L, n, and c, respectively, FSR of the waveguide 203 serving as an optical ring resonator is expressed by the following equation (1).

$$FSR=(c/n)\cdot L \tag{1}$$

The MMI optical waveguides of the first and second MMI couplers $205_1$ and $205_2$ of the interferometer 204 have an equal width of 10 μm and an equal length of 40 μm The waveguide arms $202_1$ and $203_1$ located between the couplers $205_1$ and $205_2$ have an equal length of 500 μm. By changing the temperature of the waveguide arm $203_1$ with the heater 208 for phase adjustment, the refractive index of the waveguide arm $203_1$ is changeable. Thus, the branching ratio of the interferometer 204 is changeable and at the same time, the finesse of the resonator waveguide 203 is controllable. By way of the control or adjustment of the finesse, the amount of the wavelength dispersion in the resonator waveguide 203 is adjustable. Moreover, by changing the temperature of the remaining part $203_2$ of the resonator waveguide 203 with the heater 209 for wavelength adjustment, the resonance frequency of the resonator waveguide 203 is controlled to thereby conduct the tuning operation of resonance wavelength to a desired wavelength.

The inventor actually fabricated the optical waveguide devices 200 according to the first embodiment of FIG. 3, connected eight of the devices 200 thus fabricated in cascade, and measured its delay characteristic. As a result, he obtained a wavelength dispersion of ±500 ps/nm. Thereafter, he changed the temperatures of the waveguide arm $203_1$ and the part $203_2$ of the resonator waveguide 203 with the heaters 208 and 209, respectively. Then, he confirmed that the amount of the wavelength dispersion was controllable or adjustable within the whole range of ±500 ps/nm. Moreover, when the electric currents supplied to the respective heaters 208 and 209 were optimized, he confirmed that a region where the delay time changed linearly with respect to the wavelength change was obtainable in an effective bandwidth of 60 GHz within the FSR of 100 GHz, and that an expanded operable frequency range was realizable. Furthermore, he confirmed that the insertion loss including the coupling loss of an optical fiber was as low as 3 dB and as a result, a desired characteristic was obtainable. These results will be explained in detail below.

In the optical waveguide device 200 according to the first embodiment of FIG. 3, the input/output waveguide 202 and the resonator waveguide 203 are optically coupled to each other with the first and second MMI couplers $205_1$ and $205_2$. The coupling section of the waveguides 202 and 203 constitutes the Mach-Zehnder interferometer 204. The finesse of the optical ring resonator is controllable by controlling the electric current supplied to the heater 208 for phase adjustment located to overlap with the waveguide arm $203_1$. As explained above, the first and second MMI couplers $205_1$ and $205_2$ respectively have the MMI waveguide regions $206_1$ and $206_2$ designed in such a way as to conduct the 2×2 (i.e., two-input and two-output) operation according to the Multimode Interference (MMI) theory.

The MMI theory is mainly known as a theory useful for designing a 1×N or N×N passive optical waveguide for branching or coupling signal light. For example, this theory is explained in a paper written by Lucas B. Soldano, entitled "Journal of Lightwave Technology", Vol. 13, No. 4, 1995, pp. 615–627. When the MMI length obtained according to the MMI theory is defined as $L_\pi$, the MMI length $L_\pi$ is generally given by the following equations (2) and (3).

$$We = W1 + (\gamma 0/\pi)(Nc/Nr)2\sigma(Nr2-Nc2)-(\tfrac{1}{2}) \quad (2)$$

$$L_\pi = 4Nr \cdot We \cdot (\tfrac{2}{3}\gamma 0) \quad (3)$$

In the equations (2) and (3), W1 is the width of the MMI region, Nr is the refractive index of an optical waveguide (i.e., a core), Nc is the refractive index of a clad of the waveguide, γ0 is the wavelength of incident light, and σ is a parameter having a value of 0 (i.e., σ=0) if the incident light is in the TE mode or a value of 1 (i.e., σ=1) if the incident light is in the axial mode.

According to the MMI theory, the MMI region serves as a 1×N (i.e., one input and N output) optical waveguide when the following equation (4) is satisfied, where N is a positive integer and $L_M$ is the length of the MMI region.

$$L_M = (\tfrac{3}{4})NL_\pi \quad (4)$$

Moreover, the MMI region serves as a N×N (i.e., N input and N output) optical waveguide when the following equation (5) is satisfied.

$$L_M = (3/N)L_\pi \quad (5)$$

In the device 200 according to the first embodiment of FIG. 3, N is set as 2. Therefore, the MMI waveguide regions $206_1$ and $206_2$ of the first and second MMI optical couplers $205_1$ and $205_2$ serve as 2×2 (i.e., 2 input and 2 output) optical couplers $205_1$ and $205_2$, respectively.

Next, the operation of the ring-shaped resonator waveguide 203 as the optical ring resonator is explained below.

The frequency characteristic of the optical ring resonator is characterized by the peaks in a spectrum formed at its peculiar resonance frequencies. This means that input signal light having a frequency equal to one of the resonance frequencies is outputted from the resonator waveguide 203 to the input/output waveguide 202 and thus, the resonator waveguide 203 has a function of an optical frequency or wavelength filter. The resonance frequencies appear at specific intervals termed the so-called "FSR" as defined by the above-identified equation (1). To realize the FSR of 50 GHz with an optical waveguide made of silicate glass (refractive index n≈1.5), the total length L of the resonator waveguide 203 needs to be set at 4 mm (i.e., L=4 mm).

By applying a phase change to the effective optical path length (n·L) of the resonator waveguide 203 in such a way as to be approximately equal to one wavelength of the input signal light at the maximum with the use of the heater 209 for wavelength adjustment located to overlap with the resonator waveguide 203, the location of the resonance frequencies fr is changeable within the width of the FER. This means that the resonance frequencies fr is tunable with the use of the heater 209. Moreover, by controlling the temperature of the waveguide arm $203_1$ of the Mach-Zehnder interferometer 204 with the heater 208 located to overlap with the same arm $203_1$, the finesse of the ring resonator is changeable. This means that the amount of the wavelength dispersion is adjustable.

The transfer function F of the ring resonator (i.e., the resonator waveguide 203) as an optical filter function is given by the following equation (6), where A is an optical output, $A_o$ is an optical input, κ is the mode-coupling coefficient, l is the coupling length, ρ is the propagation loss of the resonator waveguide 203, β is the propagation constant, and L is the length of the waveguide 203.

$$F = \frac{A}{A_0} = \frac{\cos(\kappa l) - \exp\left(-\tfrac{\rho}{2}L - j\beta L\right)}{1 - \cos(\kappa l)\exp\left(-\tfrac{\rho}{2}L - j\beta L\right)} \quad (6)$$

The phase Φ of the transfer function F is given by the following equation (7) by obtaining the ratio of the imaginary part of Φ to the real part thereof.

$$\Phi = \tan^{-1}\left(\frac{\mathrm{Im}(F)}{\mathrm{Re}(F)}\right) \quad (7)$$

Furthermore, the group delay time τg is given as the following equation (8) by differentiating the phase Φ by the wavelength γ, where C is the velocity of light.

$$\tau g = \frac{\lambda}{2\kappa C}\frac{d\Phi}{d\lambda} \quad (8)$$

Figure 6:
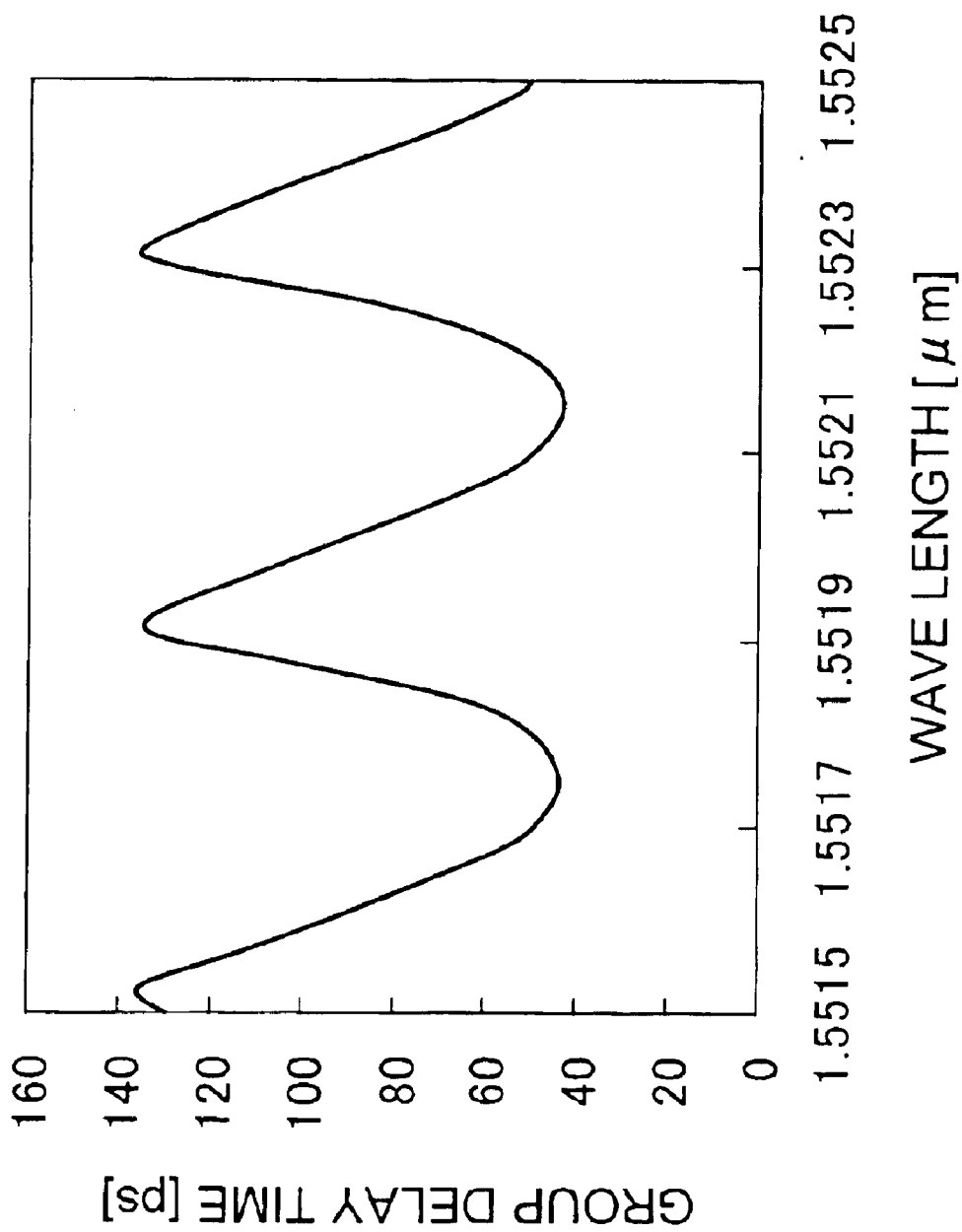
FIG. 6 is a graph showing the relationship between the group delay time and the wavelength of the ring resonator in the optical waveguide device according to the first embodiment of FIG. 3.

FIG. 6 shows the calculation result of the wavelength dependence of the group delay time τg in the ring resonator (i.e., the resonator waveguide 203). This result was obtained by the inventor's calculation under the condition that four of the ring resonators were connected in cascade, the length L of each resonator 203 was set at 4 mm, and the electric current supplied to the heater 208 for phase adjustment was optimized in such a way that negative values of the wavelength dispersion were obtainable within a wide wavelength range. As seen from the result of FIG. 6, a periodical delay characteristic with respect to the peculiar wavelengths of each ring resonator was obtained. For example, when the wavelength of the input light to the resonators was set at approximately 1.552 μm, a negative wavelength dispersion was obtainable and therefore, a positive wavelength dispersion occurring during propagation through an optical fiber was able to be cancelled.

With the optical waveguide device 200 according to the first embodiment of the invention, unlike the prior-art devices 100 and 120 of FIGS. 1 and 2 where the directional couplers 103, 123A, and 123B are used for optical coupling, the first and second MMI couplers $205_1$ and $205_2$ are used in the Mach-Zehnder interferometer 204 to optically couple the ring-shaped resonator waveguide 203 with the input/output waveguide 202. This means that the optically coupling section (i.e., the interferometer 204) can be downsized easily. Accordingly, the parts $203_1$ and $203_2$ of the resonator waveguide 203 other than the optical couplers $205_1$ and $205_2$ can be set relatively longer compared with the prior-art devices 100 and 120 and therefore, the total length of the resonator waveguide 203 can be decreased without decreasing its curvature radius. As a result, the operable or usable frequency range is expandable to the higher-frequency side, for example, to approximately 60 GHz or higher (which leads to higher-speed optical communication) and at the same time, the device 200 itself is downsized.

Because the device 200 itself is downsized, a larger number of the devices 200 can be fabricated from a single wafer or substrate. Thus, the fabrication cost of the device 200 can be lowered by way of the improvement of fabrication yield.

On the other hand, with the prior-art devices 100 and 120 using the directional couplers 103, 123A, and 123B, a directional coupler itself has an overall length as large as approximately 1 mm and therefore, it is difficult to decrease the total length of an optical waveguide serving as a ring resonator without decreasing its curvature radius. Therefore, the obtainable FSR is restricted to approximately 50 GHz at the maximum and further expansion of the FSR is extremely difficult.

Second Embodiment

Figure 7:
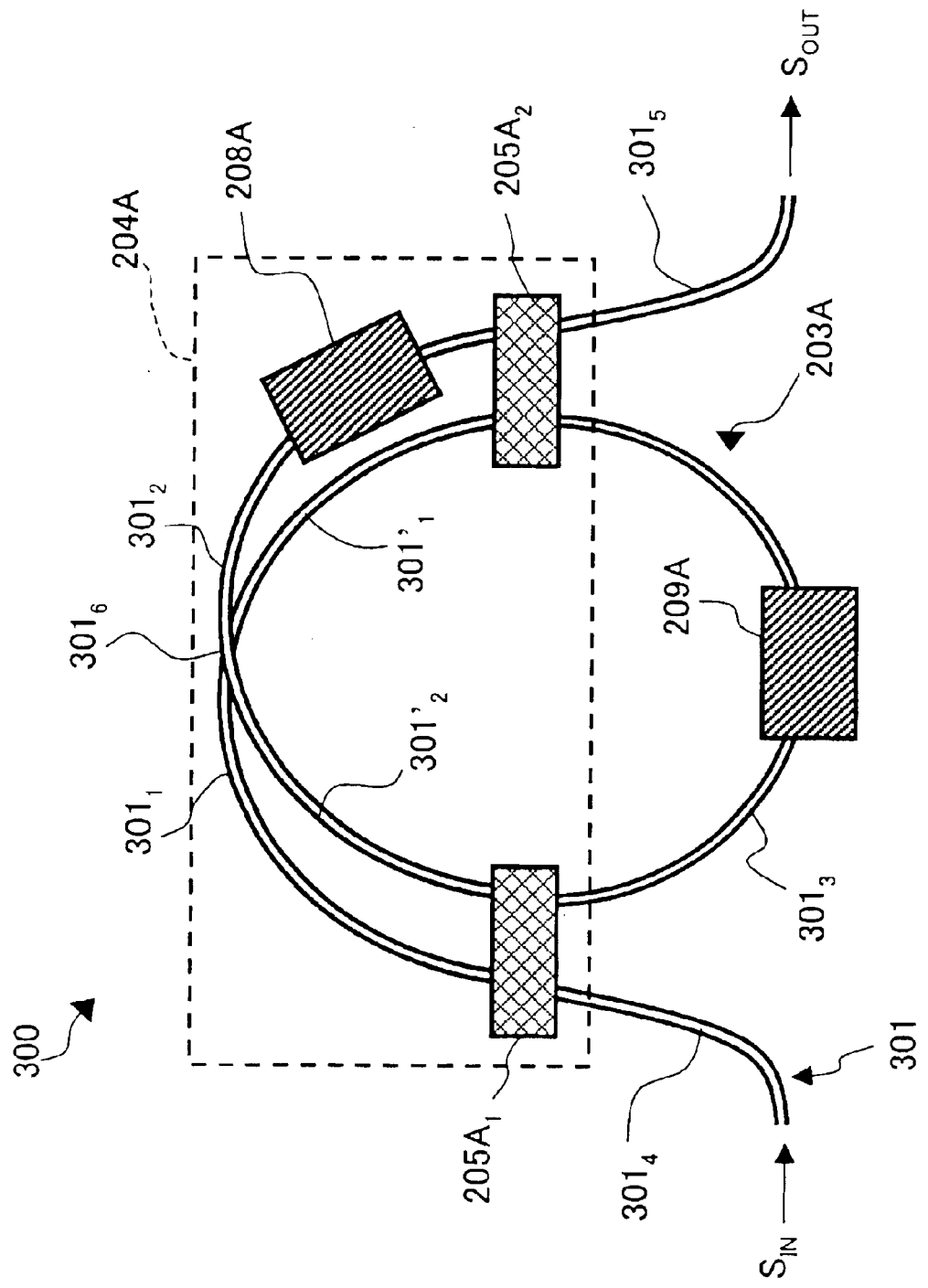
FIG. 7 is a schematic plan view showing the structure of an optical waveguide device according to a second embodiment of the invention, in which the device is configured as an optical dispersion compensation device.

FIG. 7 shows the structure of an optical waveguide device 300 according to a second embodiment of the invention, in which a suffix "A" is attached to each of the same reference symbols as those used in the first embodiment of FIG. 3. Like the first embodiment, the device 300 is configured as a dispersion compensation device.

Specifically, the optical waveguide device 300 according to the second embodiment comprises a curved optical waveguide 301 having an intersection or overlap $301_6$, a Mach-Zehnder interferometer 204A, first and second MMI optical couplers $205A_1$ and $205A_2$, a heater 208A for phase adjustment, and a heater 209 for wavelength adjustment. Unlike the device 200 according to the first embodiment of FIG. 3, an input/output optical waveguide and a ring-shaped resonator waveguide are not separated from each other. The input/output optical waveguide and the ring-shaped resonator waveguide are formed by the single optical waveguide 301.

The waveguide 301, the interferometer 204A, the first and second MMI couplers $205A_1$ and $205A_2$, and the heaters 208A and 209 are formed on the substrate 201.

The waveguide 301 has first and second curved waveguide arms $301_1$ and $301_2$ between one side (i.e., upper side in FIG. 7) of the first coupler $205A_1$ and one side (i.e., upper side in FIG. 7) of the second coupler $205A_2$. The first and second waveguide arms $301_1$ and $301_2$, which are equal in length to each other and intersected at the intersection $301_6$, serve as the Mach-Zehnder interferometer 204A along with the first and second couplers $205A_1$ and $205A_2$.

A curved part $301_3$ of the waveguide 301 between the other side (i.e., lower side in FIG. 7) of the first coupler $205A_1$ and the other side (i.e., lower side in FIG. 7) of the second coupler $205A_2$ forms a part of an optical resonator waveguide 203A. The combination of the part $301_3$, the part $301'_1$ of the first arm $301_1$ between the intersection $301_6$ and the second coupler $205A_2$, and the part $301'_2$ of the second arm $301_2$ between the intersection $301_6$ and the first coupler $205A_1$ form approximately a ring, resulting in the ring-shaped resonator waveguide 203A serving as an optical ring resonator.

The waveguide 301 has a curved part $301_4$ protruding from the other side (i.e., lower side in FIG. 7) of the first coupler $205A_1$ and a curved part $301_5$ protruding from the other side (i.e., lower side in FIG. 7) of the second coupler $205A_2$. These two parts $301_4$ and $301_5$ serve as input/output optical waveguides, respectively.

The finesse of the ring-shaped resonator 203A is adjustable by supplying an electric current to the heater 208A for phase adjustment located to overlap with the second arm $301_2$ in the interferometer 204A. Thus, a desired amount of wavelength dispersion is obtainable. On the other hand, the wavelength control is carried out by supplying an electric current to the heater 209A for wavelength adjustment located to overlap with the part $301_3$ of the waveguide 301 outside the interferometer 204A. Thus, a desired wavelength dispersion characteristic is obtainable like the device 200 according to the first embodiment of FIG. 3.

The optical waveguide device 300 according to the second embodiment can be fabricated in the same process steps as those of the device 200 of the first embodiment shown in FIGS. 5A to 5D, except that the pattern of the mask (i.e., the patterned Cr layer 225 shown in FIG. 5B) is different. Therefore, the explanation about the fabrication method of the device 300 is omitted here.

With the device 300 of the second embodiment, the same advantages as those of the device 200 of the first embodiment are obtainable because the device 300 has substantially the same structure as that of the device 200.

Third Embodiment

Figure 8:
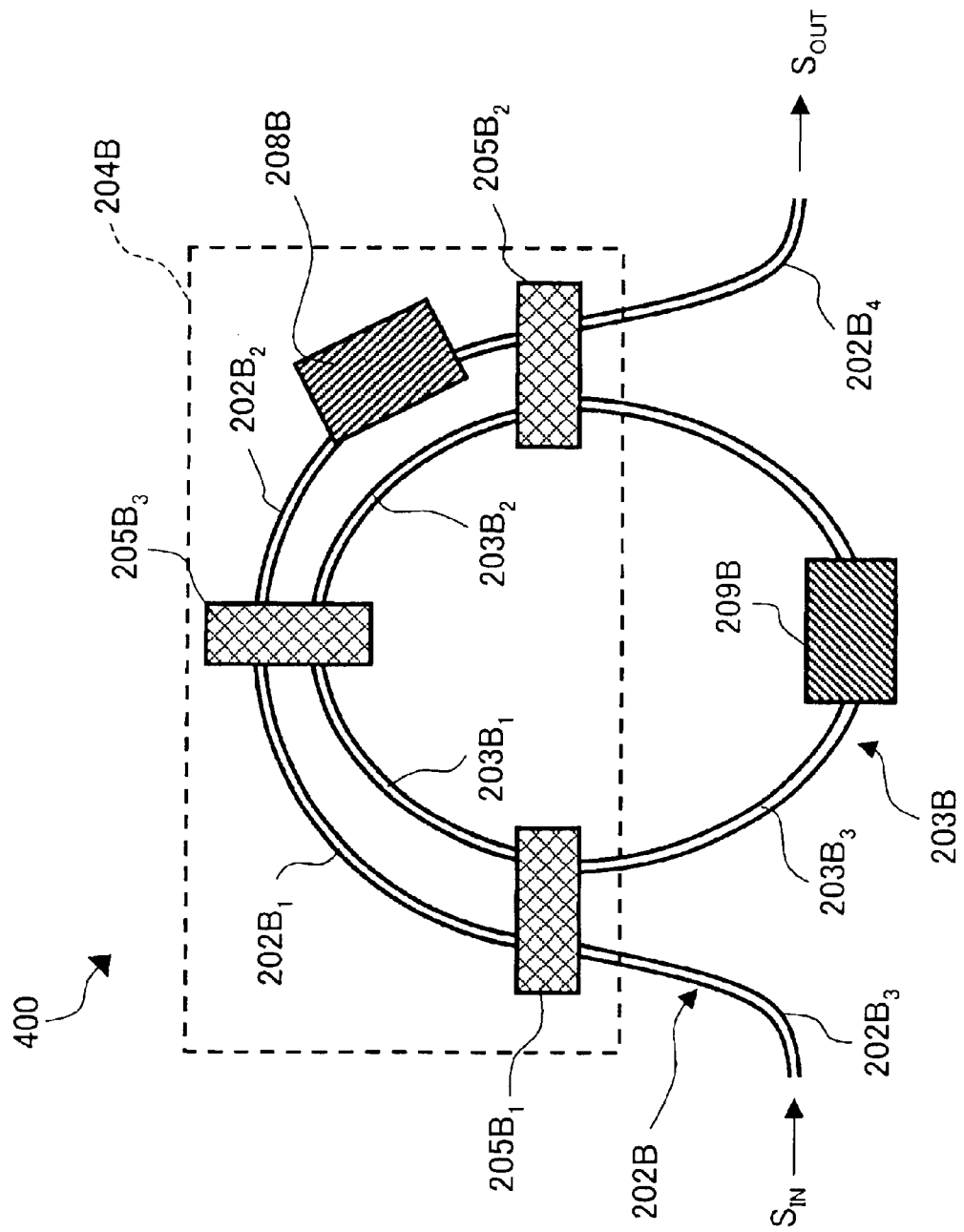
FIG. 8 is a schematic plan view showing the structure of an optical waveguide device according to a third embodiment of the invention, in which the device is configured as an optical dispersion compensation device.

FIG. 8 shows the structure of an optical waveguide device 400 according to a third embodiment of the invention, in which a suffix "B" is attached to each of the same reference symbols as those used in the first embodiment of FIG. 3. Like the first embodiment, the device 400 is configured as a dispersion compensation device.

As shown in FIG. 8, the device 400 according to the third embodiment comprises a curved optical input/output waveguide 202B, a ring-shaped optical resonator waveguide 203B serving as an optical ring resonator, a Mach-Zehnder interferometer 204B, a heater 208B for phase adjustment a heater 209B for wavelength adjustment. The waveguides 202B and 203B, the interferometer 204B, the first and second MMI couplers $205A_1$ and $205A_2$, and the heaters 208A and 209 are formed on the substrate 201. No intersection exists between the waveguides 202B and 203B, which is unlike the device 300 of the second embodiment of FIG. 7.

The interferometer 204B has first, second, and third MMI optical couplers $205B_1$, $205B_2$, and $205B_3$. The first and second MMI couplers $205B_1$ and $205B_2$ are located at approximately the same positions as those of the first and second MMI couplers $205A_1$ and $205A_2$ provided in the device 300 of the second embodiment, respectively. The third MMI coupler $205B_3$ is located at an approximately the same position as that of the intersection $301_6$ formed in the device 300 of the second embodiment. Because the third coupler $205B_3$ is provided, optical coupling can be realized between the waveguides 202B and 203B in the interferometer 204B without the intersection $301_6$ of the second embodiment and at the same time, two adjoining waveguide arms $202B_1$ and $202B_2$ and two adjoining waveguide arms $203B_1$ and $203B_2$ in the interferometer 204B can be made equal in length like the second embodiment.

The waveguide arm $202B_1$ optically interconnects the first and third couplers $205B_1$ and $205B_3$ to each other. The waveguide arm $202B_2$, which is equal in length to the arm $202B_1$, optically interconnects the second and third couplers $205B_2$ and $205B_3$ to each other. The waveguide arm $203B_1$ optically interconnects the first and third couplers $205B_1$ and $2055_3$ to each other along the waveguide arm $202B_1$. The waveguide arm $203B_2$, which is equal in length to the arm $203B_1$, optically interconnects the second and third couplers $205B_2$ and $205B_3$ to each other waveguide arm $202B_2$.

The heater 2085 for phase adjustment is located to overlap with the waveguide arm $202B_2$ between the second and third couplers $205B_2$ and $205B_3$ in the interferometer 204B. The heater 209B for wavelength adjustment is located to overlap with the waveguide arm $203B_3$ between the first and second couplers $205B_1$ and $205B_2$ outside the interferometer 204B.

The finesse of the ring resonator 203B is adjustable by supplying an electric current to the heater 208B for phase adjustment. Thus, a desired amount of wavelength dispersion is obtainable. On the other hand, the wavelength control is carried out by supplying an electric current to the heater 209B for wavelength adjustment. Thus, a desired wavelength dispersion characteristic is obtainable like the device 200 according to the first embodiment of FIG. 3.

The optical waveguide device 400 according to the third embodiment of FIG. 8 can be fabricated in the same process steps as those of the device 200 of the first embodiment shown in FIGS. 5A to 5D, except that the pattern of the mask (i.e., the Cr layer 225 shown in FIG. 5B) is different according to the difference about the pattern of the waveguides and the number of the MMI couplers. Therefore, the explanation about the fabrication method of the device 400 is omitted here.

With the device 400 of the third embodiment, the same advantages as those of the device 200 of the first embodiment are obtainable because the device 400 has substantially the same structure as that of the device 200.

Fourth Embodiment

Figure 9:
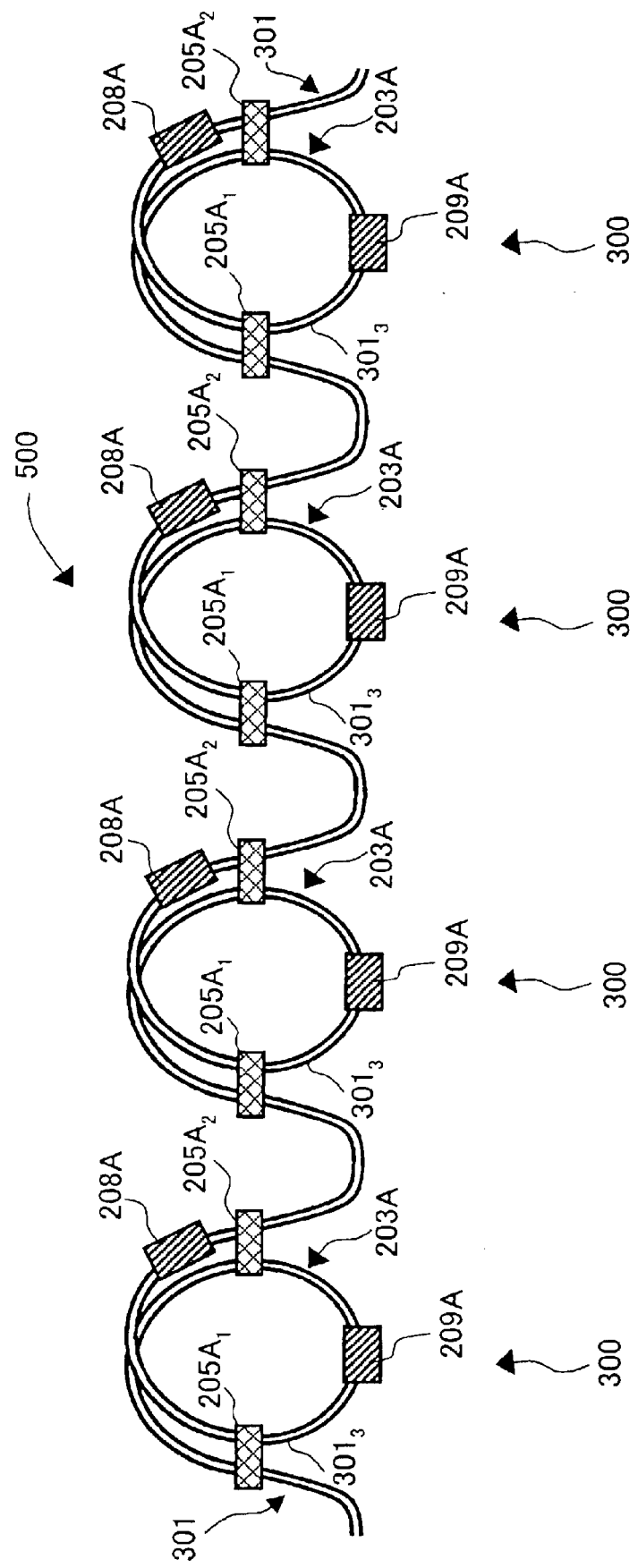
FIG. 9 is a schematic plan view showing the structure of an optical waveguide device according to a fourth embodiment of the invention, in which the device is constituted by a plurality of the devices according to the second embodiment of FIG. 7 connected in cascade to configure an optical dispersion compensation device.

FIG. 9 shows the structure of an optical waveguide device 500 according to a fourth embodiment of the invention, in which a specific number of the optical waveguide devices 300 according to the second embodiment of FIG. 7 are connected in cascade In FIG. 9, four of the devices 300 connected are shown.

When a specific number of the resonator waveguides 203A are connected in cascade by interconnecting the ends of the waveguides 301 between the adjoining devices 300, there is a tendency that the obtainable value of wavelength dispersion increases approximately proportional to the total number of the resonator waveguides 203A. Accordingly, the obtainable advantages of the device 500 of the fourth embodiment are enhanced compared with the device 300 of the second embodiment.

Although the connection number of the devices 300 is four in FIG. 9, the invention is not limited to this. The connection number of the devices 300 may be any other number if it is equal to or greater than two.

Fifth Embodiment

Figure 10:
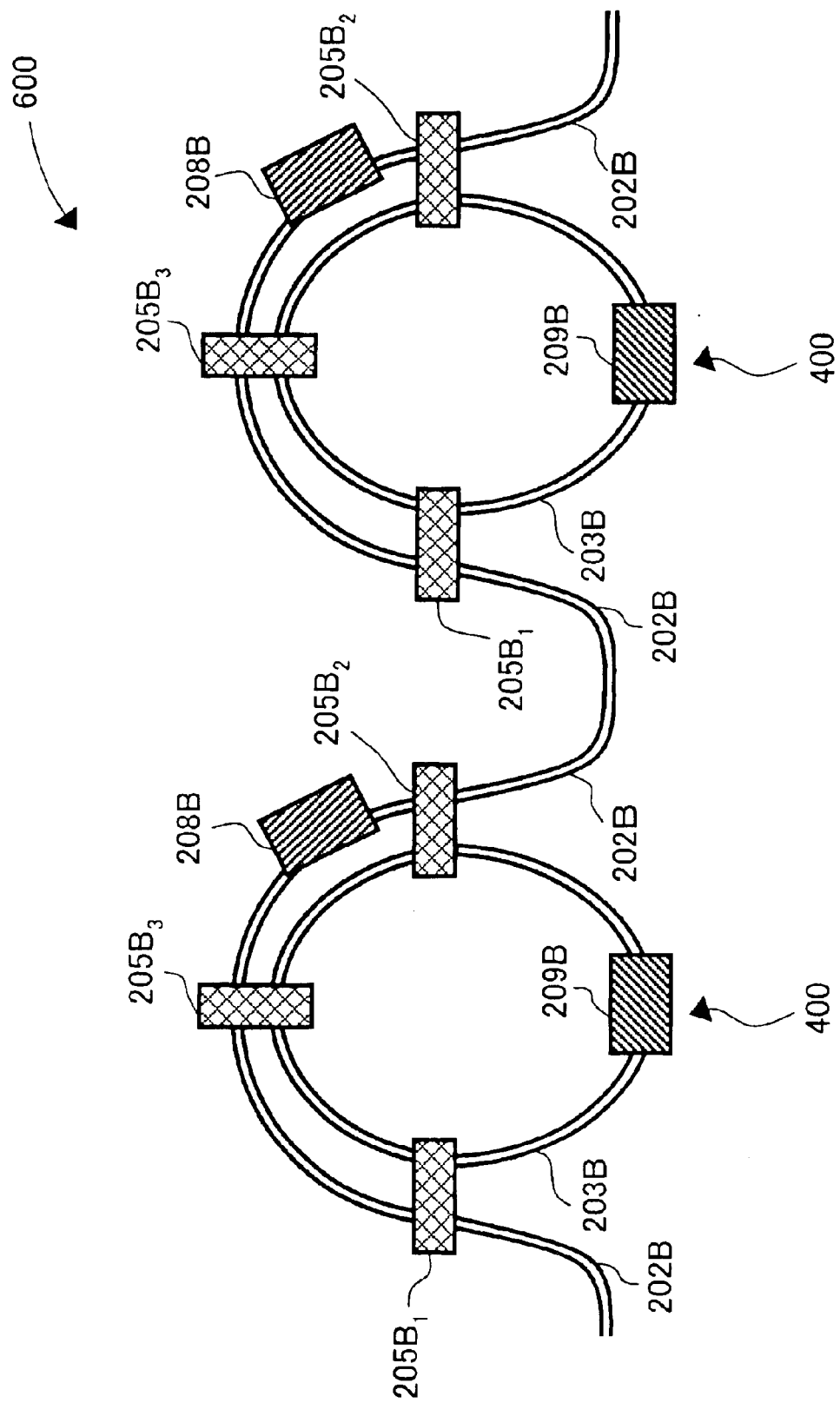
FIG. 10 is a schematic plan view showing the structure of an optical waveguide device according to a fifth embodiment of the invention, in which the device is constituted by a plurality of the devices according to the third embodiment of FIG. 8 connected in cascade to configure an optical dispersion compensation device.

FIG. 10 shows the structure of an optical waveguide device 600 according to a fifth embodiment of the invention, in which a specific number of the optical waveguide devices 400 according to the third embodiment of FIG. 8 are connected in cascade. In FIG. 10, two of the devices 400 connected are shown.

The obtainable advantages of the device 600 of the fifth embodiment are enhanced compared with the device 400 of the third embodiment.

Although the connection number of the devices 400 is two in FIG. 10, the invention is not limited to this. The connection number of the devices 400 may be any other number if it is equal to or greater than two.

Sixth Embodiment

Figure 11:
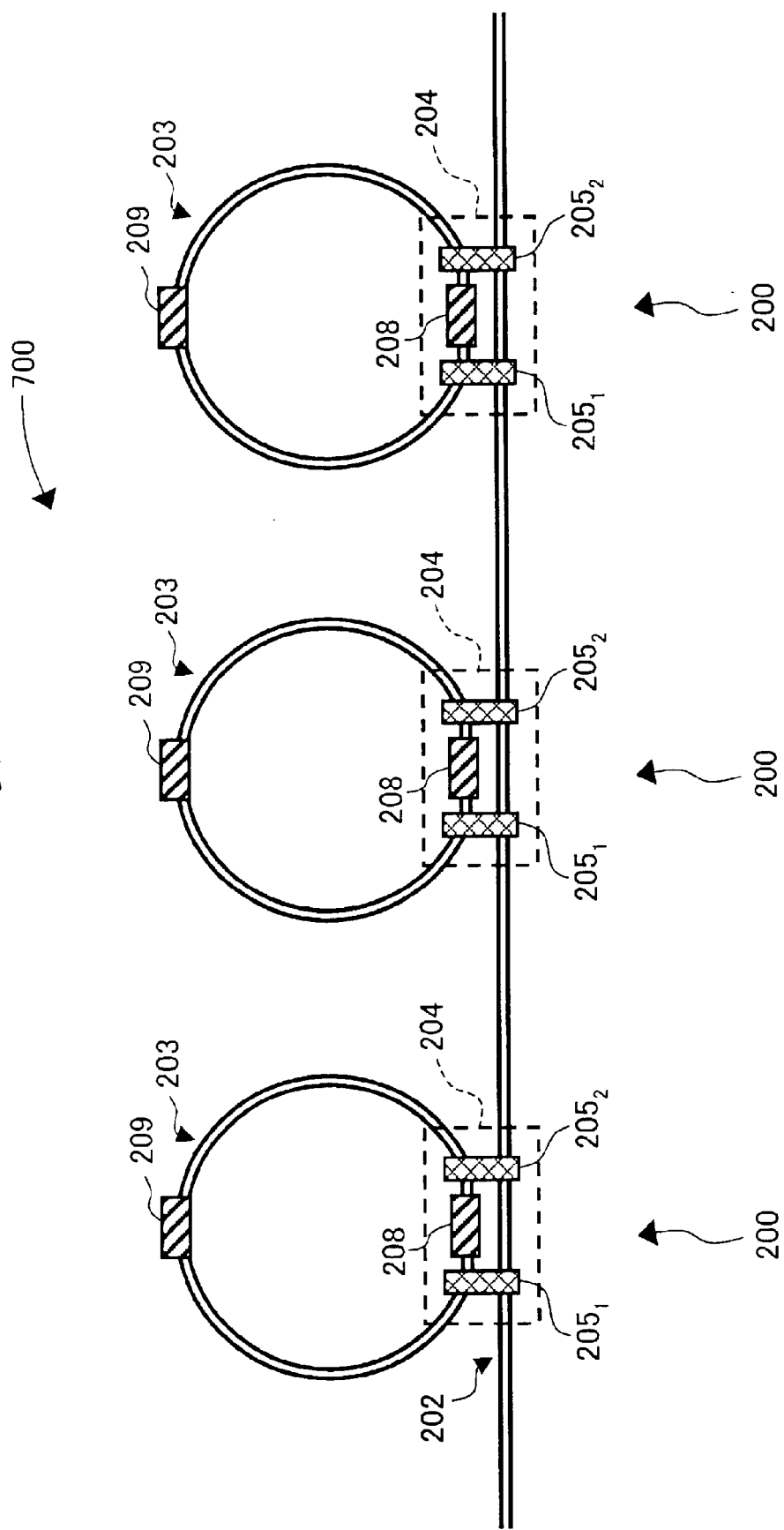
FIG. 11 is a schematic plan view showing the structure of an optical waveguide device according to a sixth embodiment of the invention, in which the device is constituted by a plurality of the devices according to the first embodiment of FIG. 3 connected in cascade to configure an optical dispersion compensation device

FIG. 11 shows the structure of an optical waveguide device 700 according to a sixth embodiment of the invention, in which a specific number of the optical waveguide devices 200 according to the first embodiment of FIG. 3 are connected in cascade. In FIG. 11, three devices 200 connected are shown.

The obtainable advantages of the device 700 of the sixth embodiment are enhanced compared with the device 200 of the first embodiment.

Although the connection number of the devices 200 is three in FIG. 11, the invention is not limited to this. The connection number of the devices 200 may be any other number if it is equal to or greater than two.

Other Embodiments

It is needless to say that the present invention is not limited to the above-described first to sixth embodiments. Any modification is applicable to the respective embodiments. For example, although SiON is used as the material of the core layer 223 in the first to sixth embodiments, any other material, for example, a silica or quartz glass doped with Ge, P, and/or boron (B), may be used for this purpose. Moreover, the material of the substrate 221 is not limited to Si. It may be made of quartz, silica, InP, GaAs, or other material.

In the above-described embodiments, the Atmospheric Pressure CVD (APCVD) process using TEOS (Tetra Ethyl Ortho Silicate) and ozone is used for forming various layers. However, any other process, such as Plasma-Enhanced CVD (PECVD) and Reduced-Pressure CVD (RPCVD), may be used for this purpose.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An optical waveguide device comprising:

a single-mode optical resonator waveguide serving as an optical ring resonator;

a single-mode optical input/output waveguide having a first end and a second end;

input signal light being inputted into the input/output waveguide at the first end and output signal light being outputted from the input/output waveguide at the second end;

the input/output waveguide being located close to the resonator waveguide in an area;

a Mach-Zehnder interferometer formed in such a way as to include a part of the resonator waveguide as its first optical waveguide arm and a part of the input/output waveguide as its second optical waveguide arm in the area; and the interferometer having a first optical coupler for optically coupling the first waveguide arm and the second waveguide arm with an input-side part of the input/output waveguide and a remaining part of the resonator waveguide due to multiple-mode optical interference, and a second optical coupler for optically coupling the first waveguide arm and the second waveguide arm with an output-side part of the input/output waveguide and the remaining part of the resonator waveguide due to multiple-mode optical interference;

wherein the resonator waveguide, the input/output waveguide, and the interferometer constitute a first optical resonator section; and wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

2. The device according to claim 1, further comprising a temperature controller to control a temperature of at least one of the first and second waveguide arms of the interferometer, thereby controlling a phase of signal light propagating in the interferometer;
  wherein the temperature controller is formed to overlap with the at least one of the first and second waveguide arms.

3. The device according to claim 1, further comprising a temperature controller to control a temperature of the resonator waveguide, thereby controlling a wavelength of signal light propagating in the resonator waveguide;
  wherein the temperature controller is formed to overlap with, the resonator waveguide.

4. The device according to claim 1, wherein the resonator waveguide is made of a material having a refractive index greater than that of a material surrounding the resonator waveguide by 4% or greater.

5. The device according to claim 1, wherein a connection count of the first resonator section and the at least one additional optical resonator section is three or more.

6. An optical waveguide device comprising:
  an optical resonator waveguide serving as an optical ring resonator;
  an input/output optical waveguide having a first end and a second end;
  input signal light being inputted into the input/output waveguide at the first end and output signal light being outputted from the input/output waveguide at the second end;
  the input/output waveguide being located close to the resonator waveguide in an area;
  a Mach-Zehnder interferometer formed in such a way as to include a part of the resonator waveguide as its first optical waveguide arm and a part of the input/output waveguide as its second optical waveguide arm in the area; and
  the interferometer having a first optical coupler with a first multiple-mode optical waveguide region in which multiple-mode optical interference occurs, and a second optical coupler with a second multiple-mode optical waveguide region in which multiple-mode optical interference occurs;
  wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;
  and wherein an input-side part of the input/output waveguide and a remaining part of the resonator waveguide are optically connected to the first multiple-mode waveguide region on its second connection side while an output-side part of the input/output waveguide and the remaining part of the resonator waveguide are optically connected to the second multiple-mode waveguide region on its second connection side;
  wherein the resonator waveguide, the input/output waveguide, and the interferometer constitute a first optical resonator section; and
  wherein at least one additional optical resonator section having a same configuration as the first resonator section is additionally provided in such a way as to be connected in cascade to the first resonator section; and
  wherein a total length of the resonator waveguide is determined in such a way that an operable frequency is 25 GHz or greater.

7. The device according to claim 6, further comprising a temperature controller to control a temperature of at least one of the first and second waveguide arms of the interferometer, thereby controlling a phase of signal light propagating in the interferometer;
  wherein the temperature controller is formed to overlap with the at least one of the first and second waveguide arms.

8. The device according to claim 6, further comprising a temperature controller to control a temperature of the resonator waveguide, thereby controlling a wavelength of signal light propagating in the resonator waveguide;
  wherein the temperature controller is formed to overlap with the resonator waveguide.

9. The device according to claim 6, wherein the resonator waveguide is made of a material having a refractive index greater than that of a material surrounding the resonator waveguide by 4% or greater.

10. The device according to claim 6, wherein a connection count of the first resonator section and the at least one additional optical resonator section is three or more.

11. An optical waveguide device comprising:
  a Mach-Zehnder interferometer including a first optical coupler, a second optical coupler, a first optical waveguide arm connecting the first coupler with the second coupler, and a second optical waveguide arm connecting the first coupler with the second coupler in such a way as to intersect the first waveguide arm;
  the first coupler having a first multiple-mode optical waveguide region in which multiple-mode optical interference occurs;
  the second coupler having a second multiple-mode optical waveguide region in which multiple-mode optical interference occurs;
  an optical resonator waveguide serving as an optical ring resonator, connected in such a way that an end of the resonator waveguide is connected to the first coupler and the other end thereof is connected to the second coupler;
  an optical input waveguide connected in such a way that an end of the input waveguide is connected to the first coupler; and
  an optical output waveguide connected in such a way that an end of the output waveguide is connected to the second coupler;
  wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;
  and wherein an end of the input waveguide is optically connected to the first multiple-mode waveguide region on its second connection side while an end of the output waveguide is optically connected to the second multiple-mode waveguide region on its second connection side;
  wherein the resonator waveguide, the input waveguide, the output waveguide, and the interferometer constitute a first optical resonator section; and
  wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

12. The device according to claim 11, further comprising a temperature controller to control a temperature of at least one of the first and second waveguide arms of the interferometer, thereby controlling a phase of signal light propagating in the interferometer;
   wherein the temperature controller is formed to overlap with the at least one of the first and second waveguide arms.

13. The device according to claim 11, further comprising a temperature controller to control a temperature of the resonator waveguide, thereby controlling a wavelength of signal light propagating in the resonator waveguide;
   wherein the temperature controller is formed to overlap with the resonator waveguide.

14. The device according to claim 11, wherein the resonator waveguide is made of a material having a refractive index greater than that of a material surrounding the resonator waveguide by 4% or greater.

15. The device according to claim 11, wherein a connection count of the first resonator section and the at least one additional optical resonator section is three or more.

16. An optical waveguide device comprising:
   a Mach-Zehnder interferometer including a first optical coupler, second optical coupler, a third optical coupler located, between the first coupler and the second coupler, a first optical waveguide arm connecting the first coupler with the third coupler, a second optical waveguide arm connecting the first coupler with the third coupler in such a way as not to intersect the first waveguide arm, a third optical waveguide arm connecting the second coupler with the third coupler, a fourth optical waveguide arm connecting the second coupler with the third coupler in such a way as not to intersect the third waveguide arm;
   the first coupler having a first multiple-mode optical waveguide region in which multiple-mode optical interference occurs;
   the second coupler having a second multiple-mode optical waveguide region in which multiple-mode optical interference occurs;
   the third coupler having a third multiple-mode optical waveguide region in which multiple-mode optical interference occurs;
   an optical resonator waveguide serving as an optical ring resonator, connected in such a way that an end of the first waveguide is connected to the first coupler and the other end thereof is connected to the second coupler;
   an optical input waveguide connected in such a way that an end of the input waveguide is connected to the first coupler; and
   an optical output waveguide connected in such a way that an end of the output waveguide is connected to the second coupler;
   wherein an end of the first waveguide arm and an end of the second waveguide arm are optically connected to the first multiple-mode waveguide region on its first connection side while the other end of the first waveguide arm and the other end of the second waveguide arm are optically connected to the third multiple-mode waveguide region on its first connection side;
   and wherein an end of the third waveguide arm and an end of the fourth waveguide arm are optically connected to the second multiple-mode waveguide region on its first connection side while the other end of the third waveguide arm and the other end of the fourth waveguide arm are optically connected to the third multiple-mode waveguide region on its second connection side;
   and wherein an end of the input waveguide is optically connected to the first multiple-mode waveguide region on its second connection side while an end of the output waveguide is optically connected to the second multiple-mode waveguide region on its second connection side;
   wherein the resonator waveguide, the input waveguide, the output waveguide, and the interferometer constitute a first optical resonator section; and
   wherein at least one additional optical resonator section having a same configuration as the first resonator section is additionally provided in such a way as to be connected in cascade to the first resonator section; and
   wherein a total length of the resonator waveguide is determined in such a way that an operable frequency is 25 GHz or greater.

17. The device according to claim 16, further comprising a temperature controller to control a temperature of at least one of the first to fourth waveguide arms of the interferometer, thereby controlling a phase of signal light propagating in the interferometer;
   wherein the temperature controller is formed to overlap with the at least one of the first to fourth waveguide arms.

18. The device according to claim 16, further comprising a temperature controller to control a temperature of the remaining part of the resonator waveguide, thereby controlling a wavelength of signal light propagating in the resonator waveguide;
   wherein the temperature controller is formed to overlap with the remaining part of the resonator waveguide.

19. The device according to claim 16, wherein the resonator waveguide is made of a material having a refractive index greater than that of a material surrounding the resonator waveguide by 4% or greater.

20. The device according to claim 16, wherein a connection count of the first resonator section and the at least one additional optical resonator section is three or more.

21. A method of fabricating an optical waveguide device, comprising the steps of:
   forming an under-cladding layer with a first material over a substrate;
   forming a core layer on the under-cladding layer with a second material having a refractive index greater than that of the first material; and
   patterning the core layer in such a way as to form a single-mode optical resonator waveguide serving as an optical ring resonator, a single-mode optical input/output waveguide having a first end and a second end, and a Mach-Zehnder interferometer;
   wherein input signal light is inputted into the input/output waveguide at the first end and output signal light is outputted from the input/output waveguide at the second end;
   and wherein the input/output waveguide is located close to the resonator waveguide in an area;
   and wherein the interferometer is formed in such a way as to include a part of the resonator waveguide as its first optical waveguide arm and a part of the input/output waveguide as its second optical waveguide arm in the area;

and wherein the interferometer has a first optical coupler for optically coupling the first waveguide arm and the second waveguide arm with an input-side part of the input/output waveguide and a remaining part of the resonator waveguide due to multiple-mode optical interference, and a second optical coupler for optically coupling the first waveguide arm and the second waveguide arm with an output-side part of the input/output waveguide and the remaining part of the resonator waveguide due to multiple-mode optical interference;

wherein the resonator waveguide, the input/output waveguide, and the interferometer constitute a first optical resonator section; and wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

22. The method according to claim 21, further comprising a step of forming an upper-cladding layer to cover the patterned core layer;

a step of forming a heater layer on the upper-cladding layer; and a step of patterning the heater layer to form a temperature controller in such a way as to overlap with at least one of the first and second waveguide arms of the interferometer are additionally provided;

wherein the temperature controller is to control a temperature of the at least one of the first and second waveguide arms, thereby controlling a phase of signal light propagating in the interferometer.

23. The method according to claim 21, further comprising a step of forming an upper-cladding layer to cover the patterned core layer;

a step of forming a heater layer on the upper-cladding layer; and a step of patterning the heater layer to form a temperature controller in such a way as to overlap with the resonator waveguide are additionally provided;

wherein the temperature controller is to control a temperature of the resonator waveguide, thereby controlling a wavelength of signal light propagating in the resonator waveguide.

24. The device according to claim 21, wherein a connection count of the first resonator section and the at least one additional optical resonator section is three or more.

25. A method of fabricating an optical waveguide device, comprising the steps of:

forming an under-cladding layer with a first material over a substrate;

forming a core layer on the under-cladding layer with a second material having a refractive index greater than that of the first material; and patterning the core layer in such a way as to form an optical resonator waveguide serving as an optical ring resonator, an input/output optical waveguide having a first end and a second end, and a Mach-Zehnder interferometer;

wherein input signal light is inputted into the input/output waveguide at the first end and output signal light is outputted from the input/output waveguide at the second end;

and wherein the input/output waveguide is located close to the resonator waveguide in an area;

and wherein the Mach-Zehnder interferometer is formed in such a way as to include a part of the resonator waveguide as its first optical waveguide arm and a part of the input/output waveguide as its second optical waveguide arm in the area;

and wherein the interferometer has a first optical coupler with a first multiple-mode optical waveguide region in which multiple-mode optical interference occurs, and a second optical coupler with a second multiple-mode optical waveguide region in which multiple-mode optical interference occurs;

wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an input-side part of the input/output waveguide and a remaining part of the resonator waveguide are optically connected to the first multiple-mode waveguide region on its second connection side while an output-side part of the input/output waveguide and the remaining part of the resonator waveguide are optically connected to the second multiple-mode waveguide region on its second connection side;

wherein the resonator waveguide, the input/output waveguide, and the interferometer constitute a first optical resonator section; and wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

26. The method according to claim 25, further comprising a step of forming an upper-cladding layer to cover the patterned core layer;

a step of forming a heater layer on the upper-cladding layer; and a step of patterning the heater layer to form a temperature controller in such a way as to overlap with at least one of the first and second waveguide arms of the interferometer are additionally provided;

wherein the temperature controller is to control a temperature of the at least one of the first and second waveguide arms, thereby controlling a phase of signal light propagating in the interferometer.

27. The method according to claim 25, further comprising a step of forming an upper-cladding layer to cover the patterned core layer;

a step of forming a heater layer on the upper-cladding layer; and a step of patterning the heater layer to form a temperature controller in such a way as to overlap with the resonator waveguide are additionally provided;

wherein the temperature controller is to control a temperature of the resonator waveguide, thereby controlling a wavelength of signal light propagating in the resonator waveguide.

28. The device according to claim 25, wherein a connection count of the first resonator section and the at least one additional optical resonator section is three or more.

29. A method of fabricating an optical waveguide device, comprising the steps of:

forming an under-cladding layer with a first material over a substrate;

forming a core layer on the under-cladding layer with a second material having a refractive index greater than that of the first material; and patterning the core layer in such a way as to form a Mach-Zehnder interferometer, an optical resonator waveguide serving as an optical ring resonator, and an optical input waveguide, and an optical output waveguide;

wherein the interferometer includes a first optical coupler, a second optical coupler, a first optical waveguide arm connecting the first coupler with the second coupler, and a second optical waveguide arm connecting the first coupler with the second coupler in such a way as to intersect the first waveguide arm;

and wherein the first coupler has a first multiple-mode optical waveguide region in which multiple-mode optical interference occurs;

and wherein the second coupler has a second multiple-mode optical waveguide region in which multiple-mode optical interference occurs;

and wherein the resonator waveguide is connected in such a way that an end of the resonator waveguide is connected to the first coupler and the other end thereof is connected to the second coupler;

and wherein the input waveguide is connected in such a way that an end of the input waveguide is connected to the first coupler;

and wherein the output waveguide is connected in such a way that an end of the output waveguide is connected to the second coupler;

and wherein an end of the first waveguide arm and an end of the second waveguide arm are optically connected to the first multiple-mode waveguide region on its first connection side while the other end of the first waveguide arm and the other end of the second waveguide arm are optically connected to the second multiple-mode waveguide region on its first connection side;

and wherein an end of the input waveguide is optically connected to the first multiple-mode waveguide region on its second connection side while an end of the output waveguide is optically connected to the second multiple-mode waveguide region on its second connection side;

wherein the resonator waveguide, the input waveguide, the output waveguide, and the interferometer constitute a first optical resonator section; and wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

30. The method according to claim 29, further comprising a step of forming an upper-cladding layer to cover the patterned core layer;

a step of forming a heater layer on the upper-cladding layer; and a step of patterning the heater layer to form a temperature controller in such a way as to overlap with at least one of the first and second waveguide arms of the interferometer are additionally provided;

wherein the temperature controller is to control a temperature of the at least one of the first and second waveguide arms, thereby controlling a phase of signal light propagating in the interferometer.

31. The method according to claim 29, further comprising a step of forming an upper-cladding layer to cover the patterned core layer;

a step of forming a heater layer on the upper-cladding layer; and a step of patterning the heater layer to form a temperature controller in such a way as to overlap with the resonator waveguide are additionally provided;

wherein the temperature controller is to control a temperature of the resonator waveguide, thereby controlling a wavelength of signal light propagating in the resonator waveguide.

32. The device according to claim 29, wherein a connection count of the first resonator section and the at least one additional optical resonator section is three or more.

33. A method of fabricating an optical waveguide device, comprising the steps of:

forming an under-cladding layer with a first material over a substrate;

forming a core layer on the under-cladding layer with a second material having a refractive index greater than that of the first material; and patterning the core layer in such a way as to form a Mach-Zehnder interferometer, an optical resonator waveguide serving as an optical ring resonator, an optical input waveguide, and an optical output waveguide;

wherein the interferometer includes a first optical coupler, a second optical coupler, a third optical coupler located between the first coupler and the second coupler, a first optical waveguide arm connecting the first coupler with the third coupler, a second optical waveguide arm connecting the first coupler with the third coupler in such a way as not to intersect the first waveguide arm, a third optical waveguide arm connecting the second coupler with the third coupler, a fourth optical waveguide arm connecting the second coupler with the third coupler in such a way as not to intersect the third waveguide arm;

and wherein the first coupler has a first multiple-mode optical waveguide region in which multiple-mode optical interference occurs;

and wherein the second coupler has a second multiple-mode optical waveguide region in which multiple-mode optical interference occurs;

and wherein the third coupler has a third multiple-mode optical waveguide region in which multiple-mode optical interference occurs;

and wherein the resonator waveguide is connected in such a way that an end of the first waveguide is connected to the first coupler and the other end thereof is connected to the second coupler;

and wherein the input waveguide is connected in such a way that an end of the input waveguide is connected to the first coupler;

and wherein the output waveguide is connected in such a way that an end of the output waveguide is connected to the second coupler;

and wherein an end of the first waveguide arm and an end of the second waveguide arm are optically connected to the first multiple-mode waveguide region on its first connection side while the other end of the first waveguide arm and the other end of the second waveguide arm are optically connected to the third multiple-mode waveguide region on its first connection side;

and wherein an end of the third waveguide arm and an end of the fourth waveguide arm are optically connected to the second multiple-mode waveguide region on its first connection side while the other end of the third waveguide arm and the other end of the fourth waveguide arm are optically connected to the third multiple-mode waveguide region on its second connection side;

and wherein an end of the input waveguide is optically connected to the first multiple-mode waveguide region on its second connection side while an end of the output waveguide is optically connected to the second multiple-mode waveguide region on its second connection side;

wherein the resonator waveguide, the input waveguide, the output waveguide, and the interferometer constitute a first optical resonator section; and wherein at least one additional optical resonator section having a same configuration as the first resonator section is additionally provided in such a way as to be connected in cascade to the first resonator section; and wherein a total length of the resonator waveguide is determined in such a way that an operable frequency is 25 GHz or greater.

34. The method according to claim 33, further comprising a step of forming an upper-cladding layer to cover the patterned core layer;

a step of forming a heater layer on the upper-cladding layer; and a step of patterning the heater layer to form a temperature controller in such a way as to overlap with at least one of the first, second, third, and fourth waveguide arms of the interferometer;

wherein the temperature controller is to control a temperature of the at least one of the first, second, third, and fourth waveguide arms, thereby controlling a phase of signal light propagating in the interferometer.

35. The method according to claim 33, further comprising a step of forming an upper-cladding layer to cover the patterned core layer;

a step of forming a heater layer on the upper-cladding layer; and a step of patterning the heater layer to form a temperature controller in such a way as to overlap with the resonator waveguide are additionally provided;

wherein the temperature controller is to control a temperature of the resonator waveguide, thereby controlling a wavelength of signal light propagating in the resonator waveguide.

36. The device according to claim 33, wherein a connection count of the first resonator section and the at least one additional optical resonator section is three or more.

37. An optical waveguide device comprising:

a ring-shaped optical waveguide;

a linear optical waveguide located close to the ring-shaped waveguide with an interval;

a first optical multiple-mode interference coupler located in a part where the linear waveguide approaches the ring-shaped waveguide;

a second optical multiple-mode interference coupler located in a part where the linear waveguide approaches the ring-shaped waveguide;

wherein the first multiple-mode interference coupler and the second multiple-mode interference coupler form a Mach-Zehnder interferometer;

wherein the ring-shaped waveguide, the linear waveguide and the interferometer constitute a first optical resonator section; and wherein at least one additional optical resonator section having a same configuration as the first resonator section is additionally provided in such a way as to be connected in cascade to the first resonator section; and wherein a total length of the ring-shaped waveguide is determined in such a way that an operable frequency is 25 GHz or greater.

38. The device according to claim 37, further comprising a temperature controller for controlling a phase of signal light propagating in the interferometer;

wherein the temperature controller is formed to overlap with the ring-shaped waveguide in the interferometer.

39. The device according to claim 37, further comprising a temperature controller for controlling a wavelength of signal light propagating in the interferometer;

wherein the temperature controller is formed to overlap with the ring-shaped waveguide outside the interferometer.

40. The device according to claim 37, wherein a connection count of the first resonator section and the at least one additional optical resonator section is three or more.

* * * * *